(12) United States Patent
Kenkre et al.

(10) Patent No.: US 9,933,971 B2
(45) Date of Patent: Apr. 3, 2018

(54) METHOD AND SYSTEM FOR IMPLEMENTING HIGH YIELD DE-DUPLICATION FOR COMPUTING APPLICATIONS

(71) Applicant: Nutanix, Inc., San Jose, CA (US)

(72) Inventors: Baban K. Kenkre, Santa Clara, CA (US); Kannan Muthukkaruppan, Union City, CA (US)

(73) Assignee: Nutanix, Inc., San Jose, CA (US)

( * ) Notice: Subject to any disclaimer, the term of this patent is extended or adjusted under 35 U.S.C. 154(b) by 87 days.

(21) Appl. No.: 14/984,394

(22) Filed: Dec. 30, 2015

(65) Prior Publication Data
US 2017/0192712 A1    Jul. 6, 2017

(51) Int. Cl.
G06F 3/06 (2006.01)
(52) U.S. Cl.
CPC ............ G06F 3/0641 (2013.01); G06F 3/065 (2013.01); G06F 3/067 (2013.01); G06F 3/0619 (2013.01)

(58) Field of Classification Search
None
See application file for complete search history.

(56) References Cited

U.S. PATENT DOCUMENTS

| | | | | |
|---|---|---|---|---|
| 7,567,188 B1 * | 7/2009 | Anglin | ................... | G06F 3/0608 341/63 |
| 8,195,636 B2 * | 6/2012 | Stager | ................... | G06F 9/5022 707/662 |
| 8,601,473 B1 * | 12/2013 | Aron | ................... | G06F 9/45533 709/223 |
| 8,977,812 B1 * | 3/2015 | Chen | ................... | G06F 3/0608 707/692 |
| 9,152,333 B1 | 10/2015 | Johnston et al. | | |
| 9,189,402 B1 | 11/2015 | Smaldone et al. | | |
| 9,442,806 B1 * | 9/2016 | Bardale | ............... | G06F 11/1453 |
| 2010/0094817 A1 * | 4/2010 | Ben-Shaul | ............ | G06F 3/0608 707/697 |
| 2010/0274772 A1 * | 10/2010 | Samuels | ........... | G06F 17/30156 707/693 |
| 2011/0107052 A1 * | 5/2011 | Narayanasamy | ..... | G06F 3/0608 711/171 |
| 2011/0170052 A1 * | 7/2011 | Lee | ........................ | G02C 5/008 351/123 |
| 2011/0191522 A1 * | 8/2011 | Condict | ................ | G06F 12/123 711/103 |
| 2013/0054545 A1 * | 2/2013 | Anglin | ................ | G06F 17/3015 707/693 |
| 2013/0091102 A1 * | 4/2013 | Nayak | ................... | G06F 3/0613 707/692 |
| 2013/0311735 A1 * | 11/2013 | Sivakumar | ............ | G06F 3/0611 711/162 |
| 2013/0318051 A1 * | 11/2013 | Kumar | .............. | G06F 17/30156 707/692 |

(Continued)

OTHER PUBLICATIONS

International Search Report and Written Opinion dated Mar. 23, 2017, for related PCT Patent Application No. PCT/US16/69434, 9 pages.

*Primary Examiner* — Mano Padmanabhan
*Assistant Examiner* — Jean Edouard
(74) *Attorney, Agent, or Firm* — Vista IP Law Group, LLP

(57) ABSTRACT

Disclosed is an improved approach for implementing de-duplication, by selecting data such that the de-duplication efficacy of the storage will be increased without arbitrarily increasing metadata size.

30 Claims, 25 Drawing Sheets

(56) References Cited

U.S. PATENT DOCUMENTS

| | | | |
|---|---|---|---|
| 2014/0006465 A1* | 1/2014 | Davis | G06F 17/30194 |
| | | | 707/827 |
| 2014/0114933 A1* | 4/2014 | Chandrasekarasastry | ................ |
| | | | G06F 12/02 |
| | | | 707/692 |
| 2014/0115182 A1* | 4/2014 | Sabaa | H04L 67/1097 |
| | | | 709/232 |
| 2014/0258370 A1* | 9/2014 | Bares | G06F 17/30159 |
| | | | 709/203 |
| 2014/0279956 A1* | 9/2014 | Trimble | G06F 3/0641 |
| | | | 707/692 |
| 2015/0046409 A1* | 2/2015 | Sharma | G06F 3/0608 |
| | | | 707/692 |
| 2015/0106345 A1 | 4/2015 | Trimble et al. | |
| 2015/0193160 A1* | 7/2015 | Li | G06F 17/30159 |
| | | | 711/162 |
| 2015/0193169 A1 | 7/2015 | Sundaram et al. | |
| 2015/0363308 A1* | 12/2015 | Park | G06F 12/0246 |
| | | | 711/103 |
| 2016/0034201 A1* | 2/2016 | Chambliss | G06F 3/0608 |
| | | | 711/159 |
| 2016/0127398 A1* | 5/2016 | Cohen | H04L 9/3231 |
| | | | 726/23 |
| 2016/0306560 A1* | 10/2016 | Maranna | G06F 3/0608 |
| 2016/0357743 A1* | 12/2016 | Swaminathan | G06F 17/3033 |

* cited by examiner

E1: A, A, A, A, B — Score = 7 + 6 = 13

E2: A, A — Score = 7

E3: B — Score = 6

E4: B — Score = 6

E5: B — Score = 6

E6: B — Score = 6

E7: A, B — Score = 7 + 6 = 13

E8: C, C, C, C, C, C, C, D — Score = 8 + 7 = 15

E9: C, D, D, D, D, D, D — Score = 8 + 7 = 15

E10: E, F, G, H — Score = 2 + 2 + 2 + 2 = 8

E11: E, F, G, H — Score = 2 + 2 + 2 + 2 = 8

References per Fingerprint

METHOD AND SYSTEM FOR IMPLEMENTING HIGH YIELD DE-DUPLICATION FOR COMPUTING APPLICATIONS

BACKGROUND

The present disclosure pertains to an improved approach to implement data de-duplication. With de-duplication, the goal is to minimize the number of copies of a given data item that is stored in a storage system. If a data item already exists in the system and is subject to de-duplication, then the storage management system will not store extra copies of that same data item. Instead, the storage management system recognizes that the data item has already been stored and will reuse the existing copy of that data item.

Whenever a data item is de-duplicated, metadata may be created by the storage management system pertaining to the de-duplication. The metadata includes, for example, identification of the specific items of de-duplicated data, information about references to the actual data item, and reference counts for the de-duplicated data.

Many systems that attempt to provide de-duplication functionality may seek to de-duplicate all of the data in the system, or by de-duplicating data which possesses a fingerprint in the system. However, even with the large-scale storage devices provided to modern information processing systems, there may be a finite amount of room that is available to store metadata for de-duplication. In addition, valuable system and computing resources may need to be consumed to actually implement the de-duplication functionality. If substantial benefits exist for performing de-duplication on a given item of data, then the metadata storage and de-duplication processing costs are usefully expended for the de-duplication. However, blindly de-duplicating all data that exists in the system, or at least all data for which a fingerprint exists, will likely lead to inefficient results since a substantial portion of the data in the system may not provide substantial-enough storage savings to offset the cost of de-duplication.

Therefore, there is a need for an improved approach to implement de-duplication that does not require de-duplication of all data within a system, but is capable of identifying data for which de-duplication will provide high-yield returns for the investment of the de-duplication resources.

SUMMARY

Embodiments of the present invention provide an improved approach for implementing de-duplication. The present disclosure provides an approach that intelligently performs de-duplication by selecting data such that the de-duplication efficacy of the storage will be increased without arbitrarily increasing metadata size.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 5A-K illustrates de-duplication for a set of example extents.

DETAILED DESCRIPTION OF THE EMBODIMENTS OF THE INVENTION

Embodiments of the present invention provide an improved approach for implementing de-duplication.

In certain storage systems, all data and/or all data that have been fingerprinted will undergo de-duplication. This indiscriminate approach to de-duplication will blindly de-duplicate even data that does not deserve to be de-duplicated, and may result in metadata growth without obtaining sufficient space savings. This is because for every saving that is obtained, there is a cost in terms of metadata and system computing/storage resources.

The present disclosure provides an approach that intelligently performs de-duplication by selecting data such that the de-duplication efficacy of the storage will be increased without arbitrarily increasing metadata size. As the system becomes more intelligent and selective in choosing high-yield data for de-duplication, this allows relaxation upon possible restrictions on generating fingerprints with respect to I/O size and storage region offsets.

In general, embodiments of the invention operate by scoring the data that can be de-duplicated, where the score relates to the amount of storage savings that potentially can be achieved by de-duplicating the data content. In this way, the storage system can identify the data which provide relatively higher levels of benefit from de-duplication, as compared to the data which will provide relatively lower savings from de-duplication. De-duplication can then be performed only upon the data items that provide the higher levels of benefit to the system.

Figure 1:
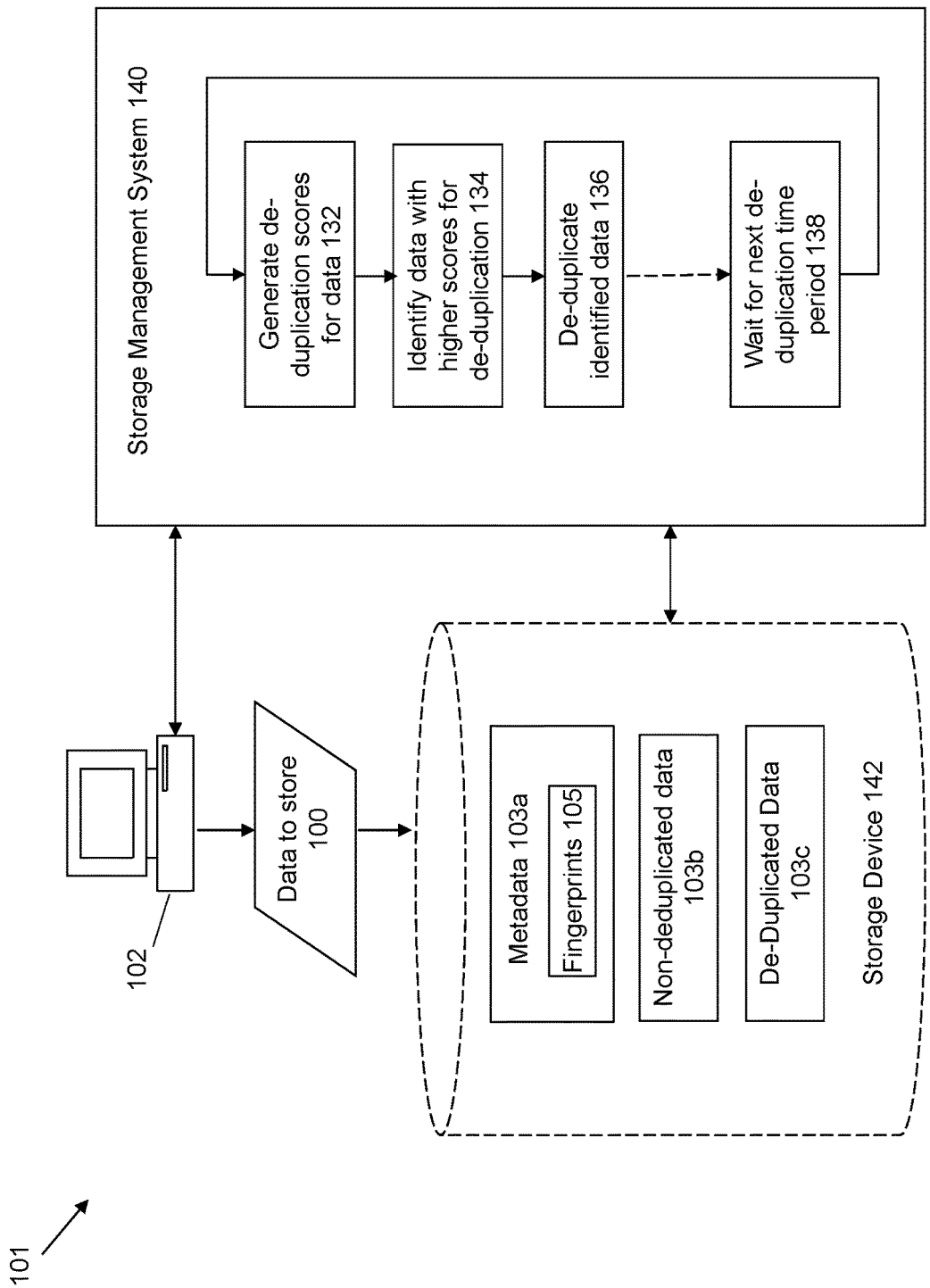
FIG. 1 illustrates an example architecture to implement de-duplication according to some embodiments of the invention.

FIG. 1 illustrates an architecture 101 for implementing de-duplication according to one embodiment of the invention. De-duplication refers to the process of making sure that a specific data item is not excessively and/or unnecessarily duplicated multiple times within a storage system. Even if there are multiple users or entities that separately perform operations to store the same data item, the de-duplication process will operate to store only a limited number of copies of the data item, but allow those multiple users/entities to commonly access the copies that are actually stored within the storage system.

This figure illustrates an approach where post-processing de-duplication is performed. This means that de-duplication is not performed "inline", at the time when data 100 is received for storage into the storage system 142. Instead, the received data 100 is first stored as non-deduplicated data 103*b*, with de-duplication occurring afterwards.

De-duplication is managed by a storage management system 140. The storage management system operates, at 132, by generating de-duplication scores for the non-deduplicated data 103*b*. One way to generate this score is by considering the space savings that exists for de-duplicating a given item of data.

To explain, consider the way in which de-duplication operates upon data. When there are multiple copies of a data item, de-duplication will remove all but one copy (although "replication factors" may be configured for redundancy purposes to explicitly allow additional copies of the de-duplicated data to exist). The removed copies will be replaced by a "reference" to the remaining copy. In this way, the storage savings generally relate to the number of extra copies that are removed, minus the cost to implement the de-duplication (e.g., metadata costs, costs to break up a larger extent into smaller chunks, and/or costs pertaining to fragmentation resulting from the de-duplication). Therefore, the greater the number of copies, the greater the potential to have a proportionally larger amount of space savings from performing de-duplication.

The scoring process can therefore be implemented by identifying the number of duplicates of the data item within the non-deduplicated data 103*b*. One way to achieve this is to count the number of non-deduplicated data 103*b* that correspond to specific fingerprints 105. The potential storage savings can then be extrapolated from the number of data items that correspond to given fingerprints, where the data items having greater number of copies generally equating to greater potential savings.

In some embodiments of the invention, only I/O operations to write data 100 into storage system 142 that is larger than 64 Kb is fingerprinted. This approach limits the amount of metadata in the system by only fingerprinting larger data items, but risks the potential to miss de-duplication on certain high-yield data if it is a smaller data item that is not fingerprinted. Alternatively, another approach that can be taken is to fingerprint every data item, regardless of its size. This approach results in increased space consumption and computational expenses to generate the fingerprint metadata, but allows the scoring process to operate with all data regardless of its size.

The US Secure Hash Algorithm 1 (SHA1) is an example of an approach that can be taken to generate fingerprints 105, e.g., using native SHA1 optimizations available on Intel processors. Other types of fingerprinting may also be used in conjunction with the invention. For example, "Rabin fingerprinting" is another technique that may be used to generate fingerprints 105.

Once scores have been generated, then at 134, the storage management system 140 will identify the data having the higher scores for de-duplication. In certain situations, limits may be placed upon the amount of data that may be de-duplicated. For example, a threshold may be imposed for the maximum number of bytes of data that may be de-duplicated for each processing cycle, e.g., 216 GB, which may also generally be translated into a threshold amount of bytes per second (e.g., 10 MB/second). Therefore, the scores of the data items can be sorted, and only the top n data items that correspond to the threshold is selected for de-duplication.

At 136, the identified data items are de-duplicated. With this operation, the extra copies of the data are removed from the non-deduplicated data 103*b*, and replaced with a referencing structure that points to the remaining data item that is not removed, resulting in the de-duplicated data 103*c*. The de-duplication data structures are stored into the metadata 103*a* to track the de-duplicated data items.

At 138, the system then waits for a period of time to re-execute this process. One approach is to establish regular intervals of time (e.g., every day at midnight or every six hours) to perform the de-duplication processing to determine which of the non-deduplicated data 103*b* should undergo de-duplication to become the de-duplicated data 103*c*. Another approach is to allow manual initiation of the process, e.g., by an administrator. Yet another approach is to initiate the process based upon triggering by a designated system condition. For example, a set of rules can be configured to identify specific storage-related conditions under which de-duplication processing will occur, e.g., when storage space consumption reaches a specific threshold level.

The system 101 may include one or more users at one or more user stations 102 that operate the storage system. The users at user station 102 correspond to any individual, organization, or other entity that uses architecture 101 for accessing and storing data. User station 102 comprises any type of computing station that may be used to use and access data from a local or remote storage device 142. Examples of such user stations 102 include for example, workstations, personal computers, mobile devices, or remote computing terminals. User station 102 comprises a display device, such as a display monitor, for displaying data to users at the user station 102. User station 102 also comprises one or more input devices for the user to provide operational control over the activities of the user station 102, such as a mouse or keyboard to manipulate a pointing object in a graphical user interface.

The storage system 142 may include one or more computer readable storage devices that hold the data and/or metadata. The computer readable storage device comprises any tangible, non-transitory combination of hardware and software that allows for ready access to the data that is located at the computer readable storage device. For example, computer readable storage device could be implemented as computer memory operatively managed by an operating system, hard disks, networked storage, cloud storage, or storage managed in a virtualization environment.

Figure 2A:
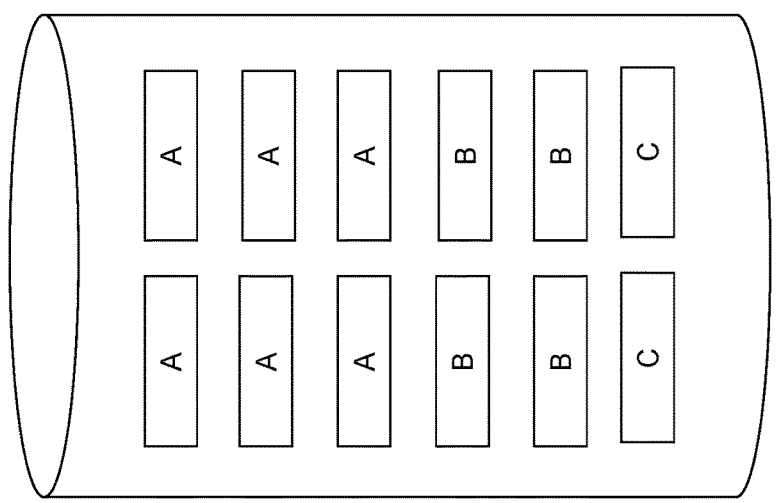
FIGS. 2A-D provides an illustration of high-yield de-duplication.

FIGS. 2A-D illustrate this process. FIG. 2A shows a set of data items within a storage system, where the stored data items correlates to a specific fingerprints "A", "B", or "C". There is a different number of each of these data items stored in the system. In particular there are six copies of data items that correlate to fingerprint "A", four copies of data items that correlate to fingerprint "B", and two copies of data items that correlate to fingerprint "C".

Figure 2B:
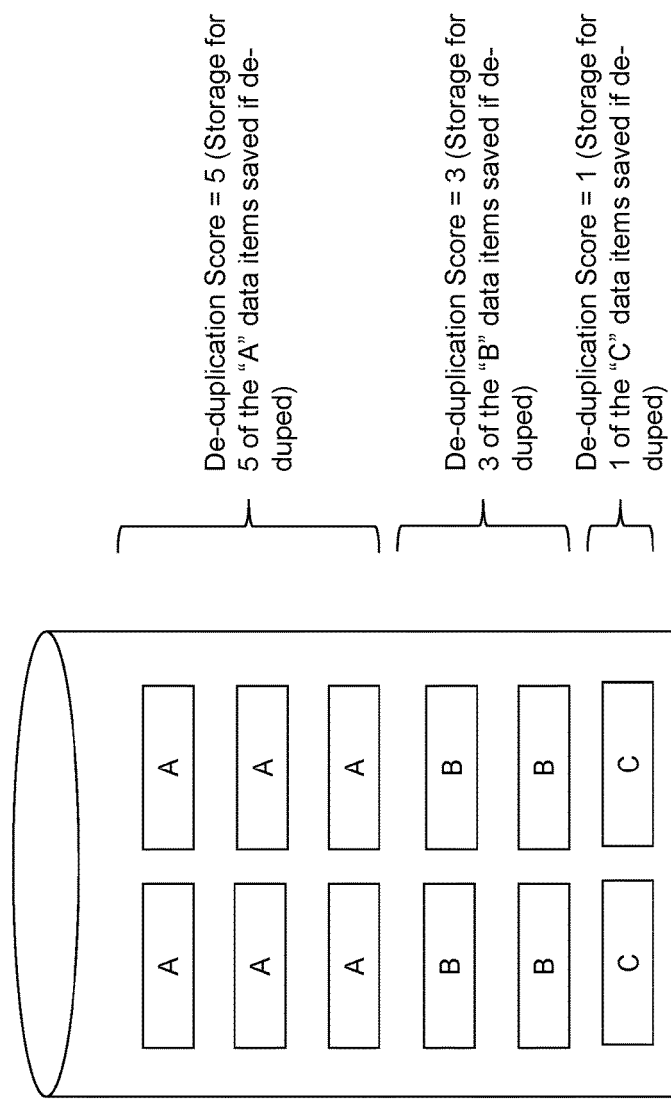

FIG. 2B illustrates an approach to score these data items. For the data items that correlate to fingerprint "A", the de-duplication score can be identified as 5. This is because there are six copies of the data. After de-duplication, only one of the data items will remain, with five of the data items no longer requiring storage space—hence resulting in 5 data items spaces being saved by the de-duplication. For the data items that correlate to fingerprint "B", the de-duplication score can be identified as 3. Since there are four "B" data items, after de-duplication, only one will remain resulting in 3 data items spaces being saved by the de-duplication. For the data items that correlate to fingerprint "C", the de-duplication score can be identified as 1. Since there are two "C" data items, after de-duplication, only one will remain resulting in only a single data item space being saved by the de-duplication.

In this situation, it can be seen that the greatest space savings is accomplished by de-duplicating the data items that correlate to fingerprint "A", followed by the data items that correlate to fingerprint "B", followed lastly by the data items that correlate to fingerprint "C".

Figure 2C:
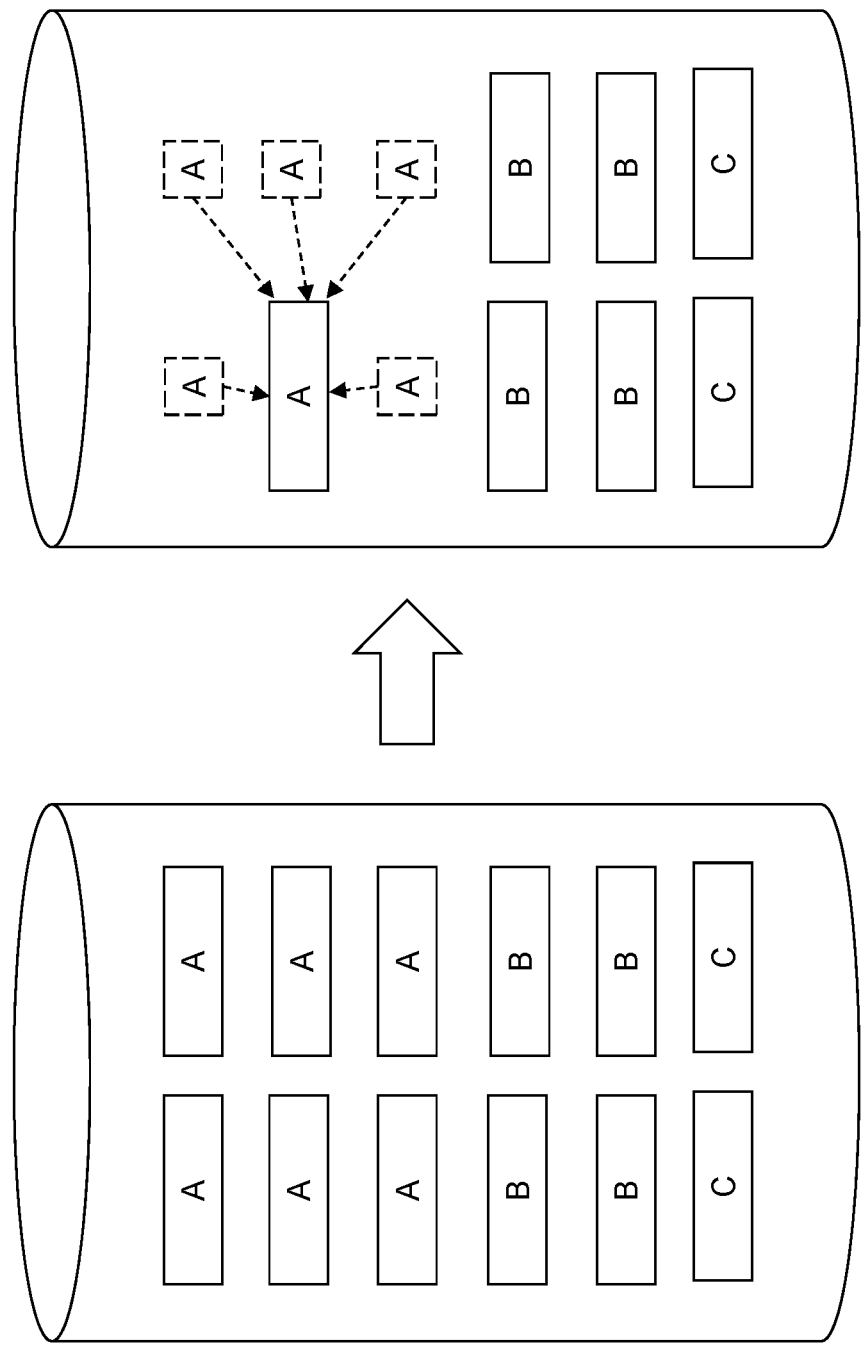

Assume that only one set of these data items is permitted to be de-duplicated in the current processing time period. In this case, the highest yield for de-duplication will clearly be achieved by de-duplicating the data items that correlate to fingerprint "A". This is illustrated in FIG. 2C, where the data items for "A" are de-duplicated such that only a single copy remains. All other copies are replaced with a reference to the remaining copy.

Figure 2D:
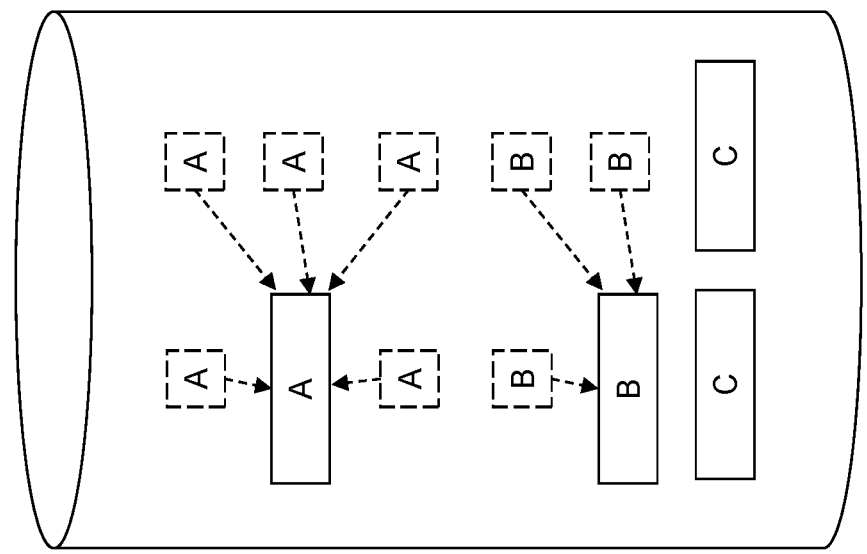
Figure 2D:
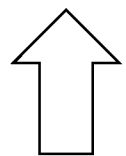
Figure 2D:
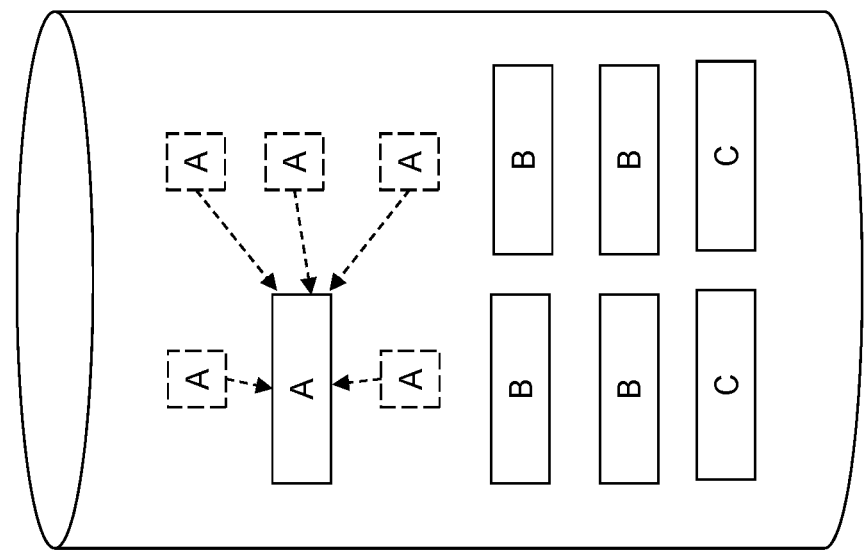

At a later processing time period, the remaining data items can be checked again to identify data items for de-duplication. Assume that once again, only one set of the data items is permitted to be de-duplicated in the current processing time period. In this case, the highest yield for de-duplication will be achieved by de-duplicating the data items that correlate to fingerprint "B". This is illustrated in FIG. 2D, where the data items for "B" are de-duplicated such that only a single copy remains. All other copies are replaced with a reference to the remaining copy. At this point, only the low-yield data items "C" remain un-deduplicated.

The de-duplication processing is made more complicated when the data items to be processed are embodied as extents. An extent refers to a contiguous portion of data that is often used in the context of systems that handle storage or data activities. A file may be divided into a number of different extents so that each extent can be separately stored into different available locations within the storage system. Different systems may implement differing size requirements for extent, often taking into account tradeoffs between extent size and system performance.

Figure 3A:
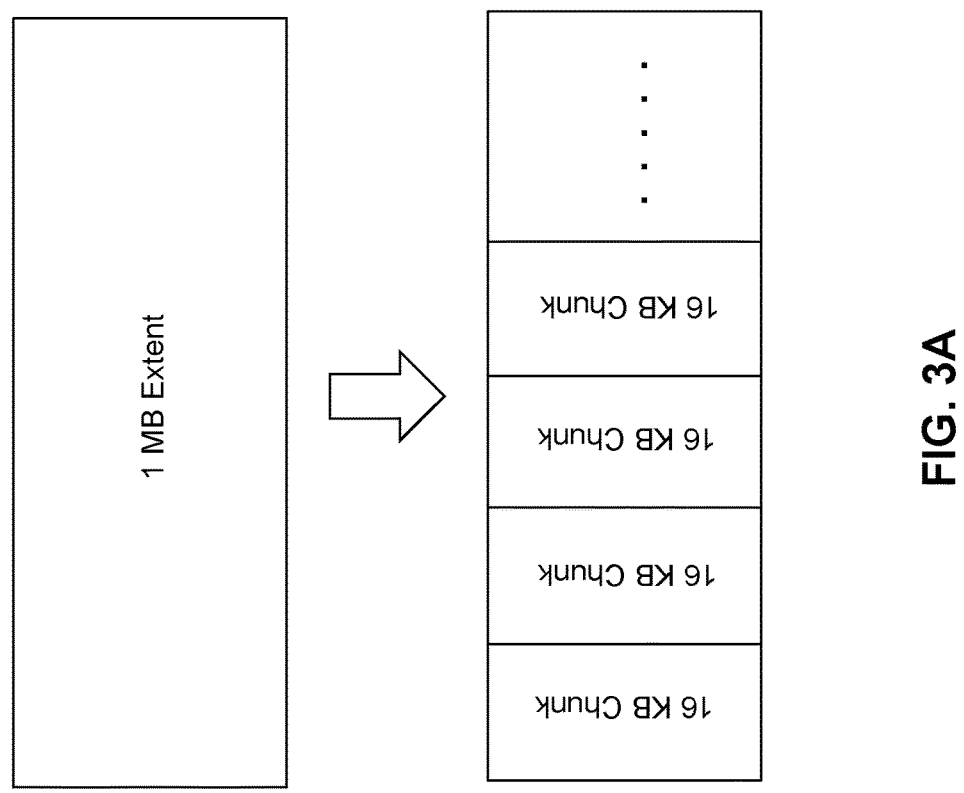
FIGS. 3A-C illustrates extents for de-duplication processing.

For storage efficiency purposes, there is often the preference to have relatively large-sized extents, e.g., 1 MB extents as shown in the top of FIG. 3A. The reason for this is because a single large extent minimizes the amount of metadata that is needed to maintain and track the quantity of data corresponding to that extent. In contrast, that same amount of 1 MB data broken up into a large number of smaller extents (e.g., 16 KB extents as shown in the bottom of FIG. 3A) will result in greater numbers of metadata entries necessary to track all of those extra extents.

However, for de-duplication purposes, there is often the preference to have relatively small-sized extents, e.g., 16 KB, 8 KB, 4 KB, or even smaller extents. The reason for this is because larger extents reduce the likelihood of finding duplicates among the stored data, and hence reduces the de-duplication yield. In contrast, smaller extents make it much more likely to identify other duplicates among the stored data, since shorter pieces of data are easier to match. The tradeoff is that for a given quantity of data, smaller extents will tend to consume much more metadata resources.

As previously noted, de-duplication does not come for free. For every saving that is obtained in data, there is also a cost that needs to be paid in metadata. Consider if a mapping metadata structure (e.g., a block map) is used to track data in the storage system. Assume the block map entry pertains to 1 MB of data. If this block map entry points to a non-deduplicated extent, it will only have one region which points to a single extent. However with de-duplicated extents, each of size 16K, the same block map representing 1M of data will have 64 regions. The size of a region with a non-deduplicated extent may be, for example, approximately 36 bytes whereas size of a region with de-duplicated extent may be, for example, 40 bytes. Therefore, if every block in the system uses de-duplicated extents, the block map entry would have grown by 70 times ((64×40)/36).

Figure 3B:
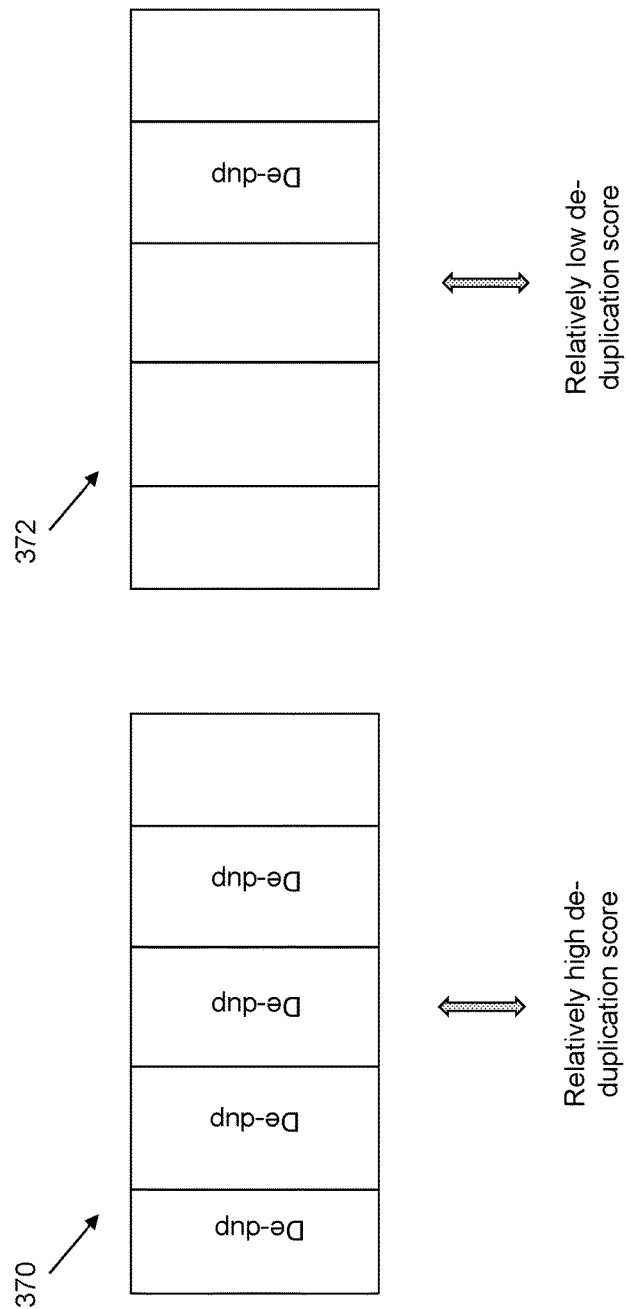

This underscores the need to intelligently determine the non-deduplicated data that should be de-duplicated (and hence broken up from a single large extent into multiple smaller chunks). Consider the extents shown in FIG. 3B. Here, extent 370 includes multiple portions (or "chunks") that are subject to de-duplication. In contrast, extent 372 includes only a single chunk that is subject to de-duplication. In this situation, extent 370 would correspond to a relatively high de-duplication score, since there would be a large amount of space savings to offset the metadata cost of de-duplication. In contrast, extent 372 would correspond to a relatively low de-duplication score, since there would be a relatively small amount of space savings to offset the metadata costs.

Figure 3C:
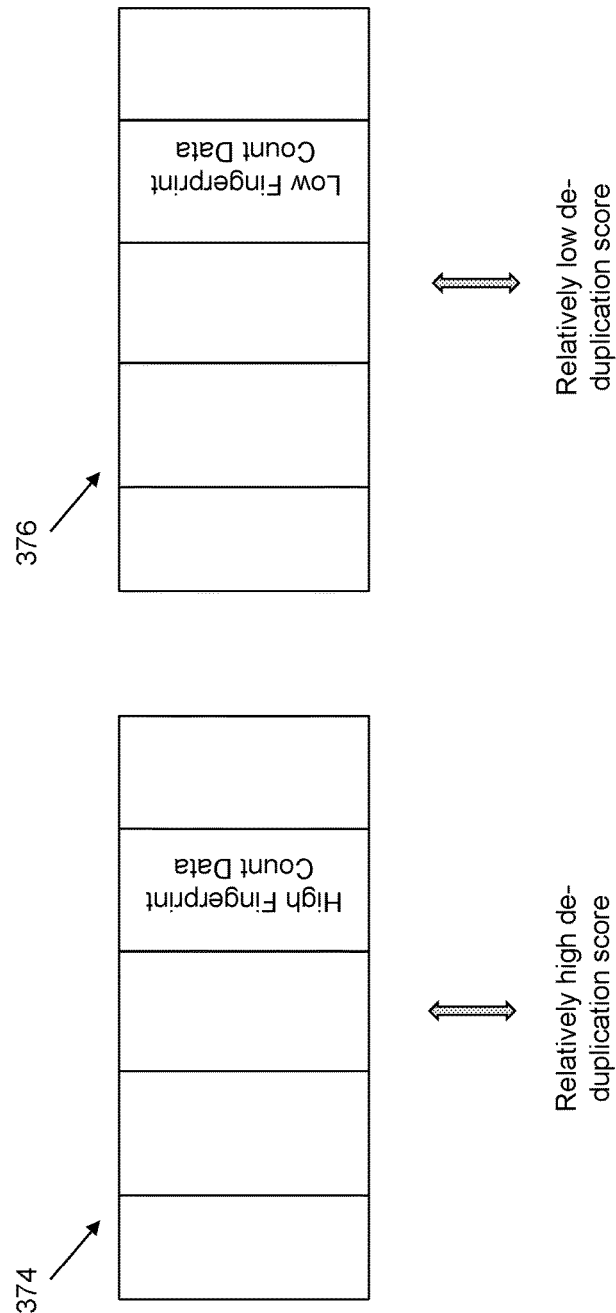

FIG. 3C illustrates another possible scenario. Here, the same number of chunks in each of the extents is subject to de-duplication. However, the chunk in extent 374 corresponds to a fingerprint that has a relatively high overall count, whereas the chunk in extent 376 corresponds to a fingerprint that has a relatively low overall count. In this case, the overall net savings to the system is potentially greater by pursuing de-duplication for any extents that have the high fingerprint count chunks (e.g., extent 374) as compared to any extents that have the low fingerprint count chunks (e.g., extent 376).

In some embodiments, the de-duplication processing occurs in two phases. The first phase pertains to generating fingerprints for the data. This is done on large sequential writes and stored in the system metadata. In some embodiments, the fingerprint is always generated on a fixed size 16 KB chunk and is aligned at 16 KB boundaries. The chunk corresponds to a unit of de-duplication and is identified by its fingerprint. In this phase there is no storage savings, as chunks with the same fingerprints in different non-deduplicated extents will have their own copy of the data.

In the second phase, relevant chunks in the non-deduplicated extents are converted to de-duplicated variants. Metadata (e.g., for virtual disk blocks) can now "reference" this de-duplicated extent and would not need multiple data copies of the chunk. The storage item (e.g., a first virtual disk), which attempts to de-duplicate its chunk, will read and write the chunk into a new de-duplicated extent. Subsequent storage items (e.g., virtual disks) will only add a reference to this extent.

Figure 4:
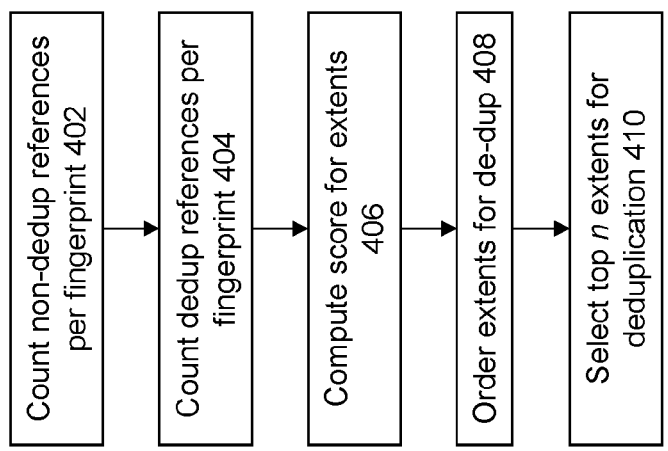
FIG. 4 shows a flowchart of an approach to implement de-duplication for extents.

FIG. 4 shows a flowchart of an approach to implement this type of processing. The process begins by counting references for fingerprints in the system. This approach selects, for example, fingerprints from among non-deduplicated extents from groupings of extents that have not been written recently. At 402, a count is made of the non-deduplicated references for each fingerprint. This operation counts the number of copies of the data item that are not yet de-duplicated. At 404, a count is made of the de-duplicated references for the fingerprints. This operation identifies the number of copies of the data item that are already de-duplicated.

At 406, scores are computed for the extents in the system. This operation totals the new and potential disk-space savings per selected extent by adding the non-deduplicated reference counts of unique fingerprints in that extent. For each unique fingerprint in the extent with a count of at least two, if the fingerprint has a non-zero de-duplication reference count (data has already been de-duplicated), then the savings is equal to the total of the non-deduplication reference count for the given chunk(s) in the extent. In this case, all non-deduplicated references count towards savings because they can all refer to the existing deduplicated chunk(s) on disk. If the fingerprint does not have a non-zero de-duplication reference count (data has not yet been de-duplicated), then the savings equals the non-deduplication reference count minus 1 for the given chunk(s). In this case, one reference needs to be written to disk and the rest will count towards savings. Generally, the potential disk space savings equals the savings multiplied by the chunk-size.

At 408, the extents are then ordered for de-duplication. The extents can be ordered using the savings score. At 410, the top n extents are de-duplicated. The number of extents to de-duplicate is based at least in part on the number that fits within any established threshold. In one embodiment, a fixed value is used to limit the number of de-duplication bytes per processing cycle. This value is computed by, for example, assuming the bandwidth to be 10 MB/sec and period of 6 hours for a full scan. This evaluates to "10×1024×1024×6× 60×60" bytes or 210 GB.

Figure 5A:
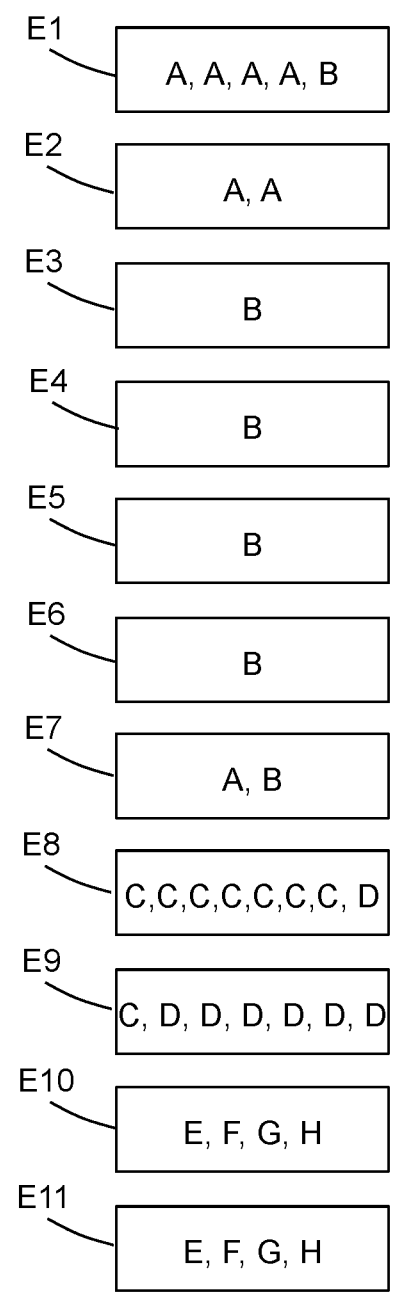

FIGS. 5A-K illustrate this process for a set of example extents. FIG. 5A shows a set of extents E1, E2, E3, E4, E5, E6, E7, E8, E9, E10, and E11. Each of these extents includes chunks that correspond to a given fingerprint. For example, extent E1 includes four chunks that correspond to fingerprint "A" and one chunk that correspond to fingerprint "B". The other extents similarly includes chunks that corresponds to any of fingerprints "A", "B", "C", "D", "E", F", "G", and/or "H".

Figure 5B:
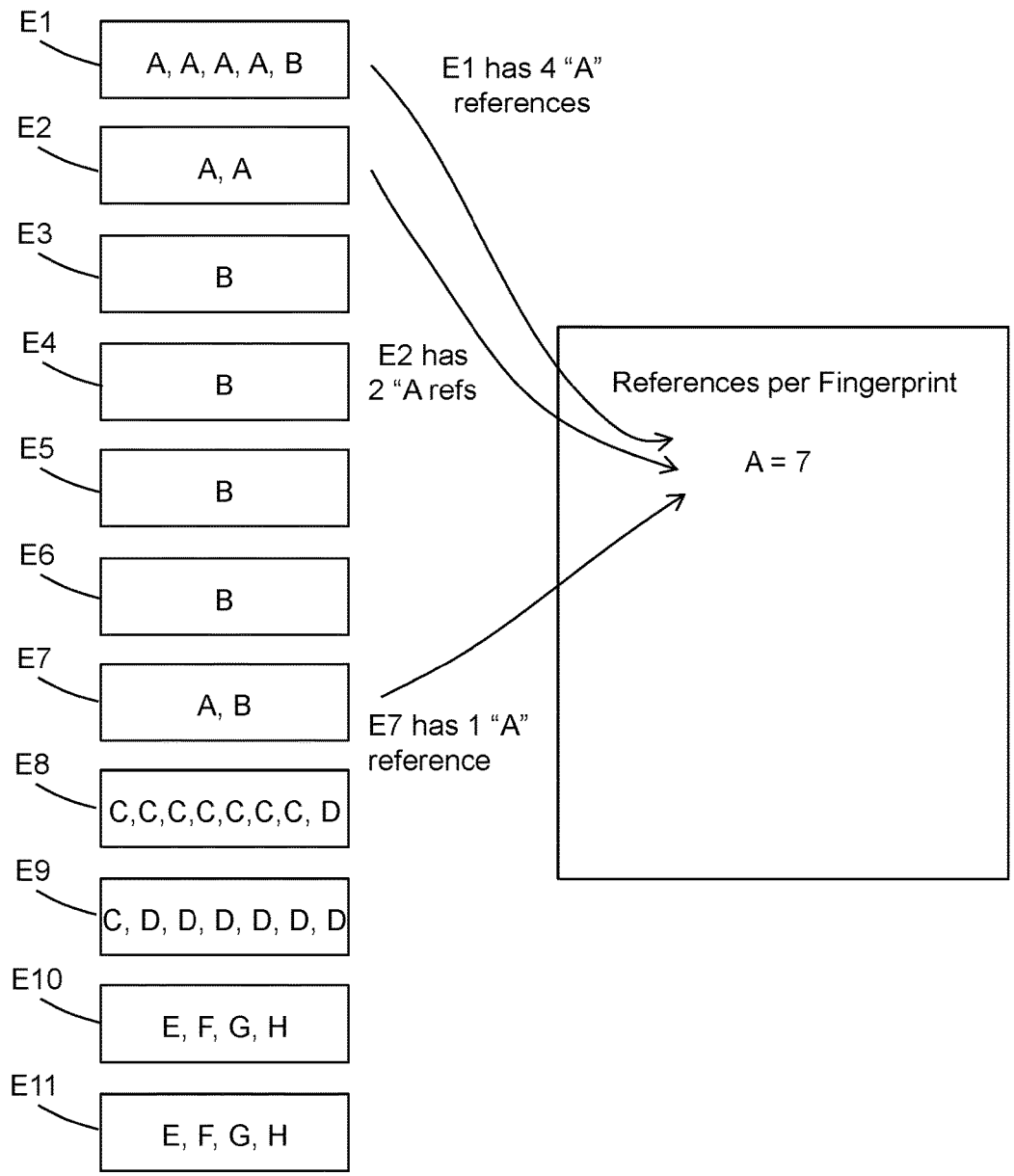

The process begins by counting the number of references for each fingerprint from among the extents. FIG. 5B illustrates the process to perform the reference count for fingerprint "A". Here, extent E1 has four "A" references, extent E2 has two "A" references, and extent E7 has one "A" reference. This results in a total of 7 references for the "A" fingerprint.

Figure 5C:
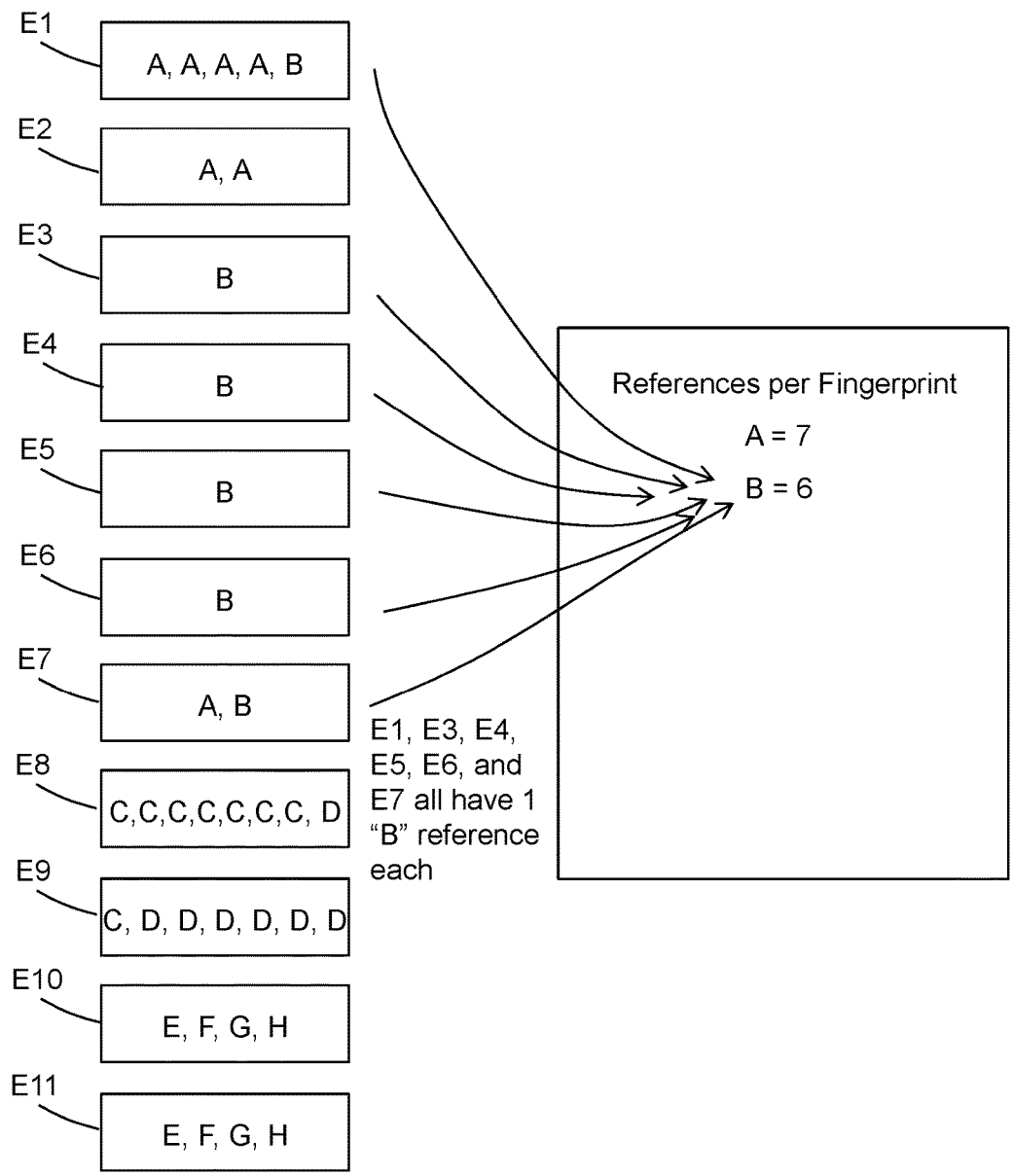
Figure 5D:
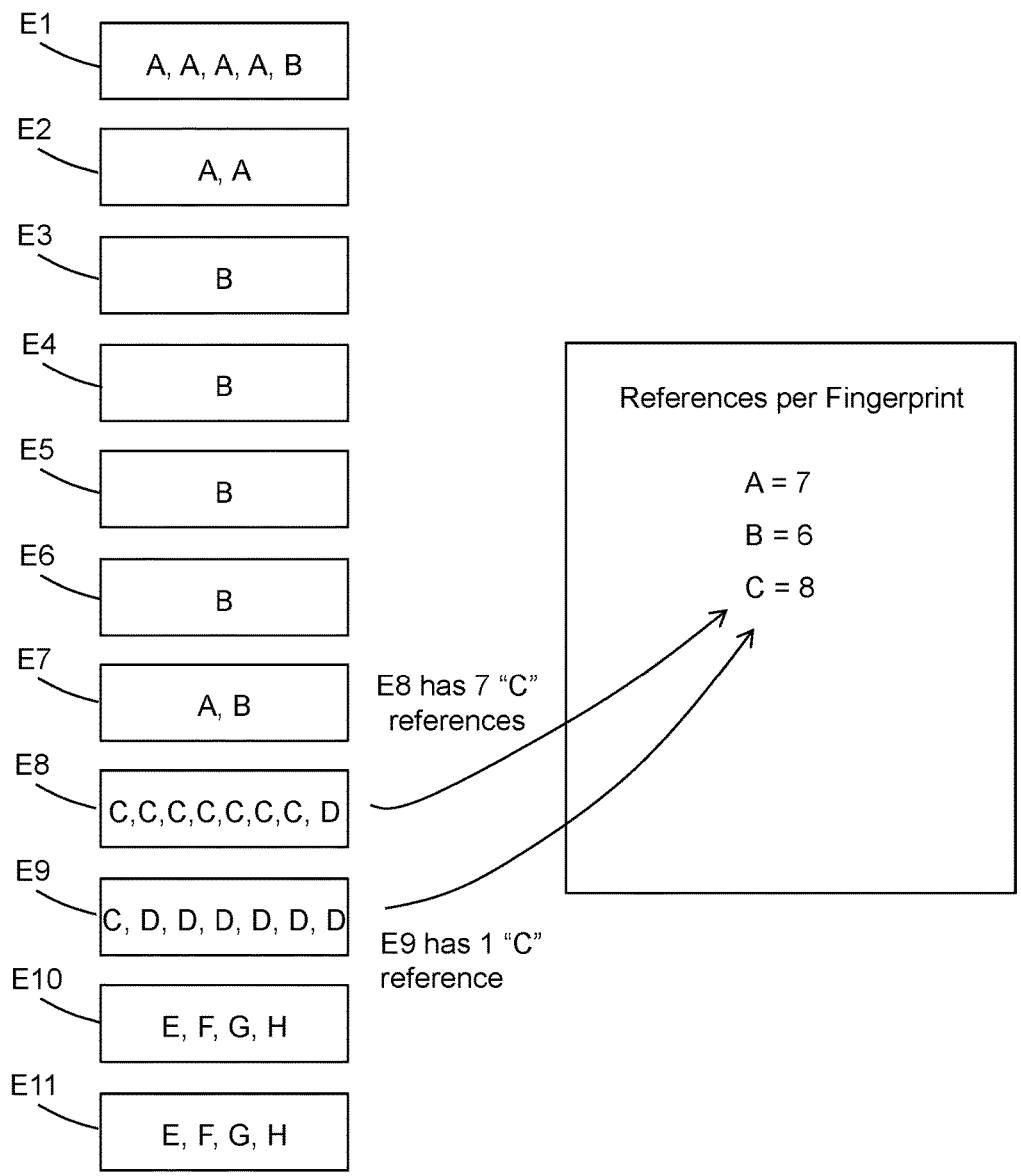
Figure 5E:
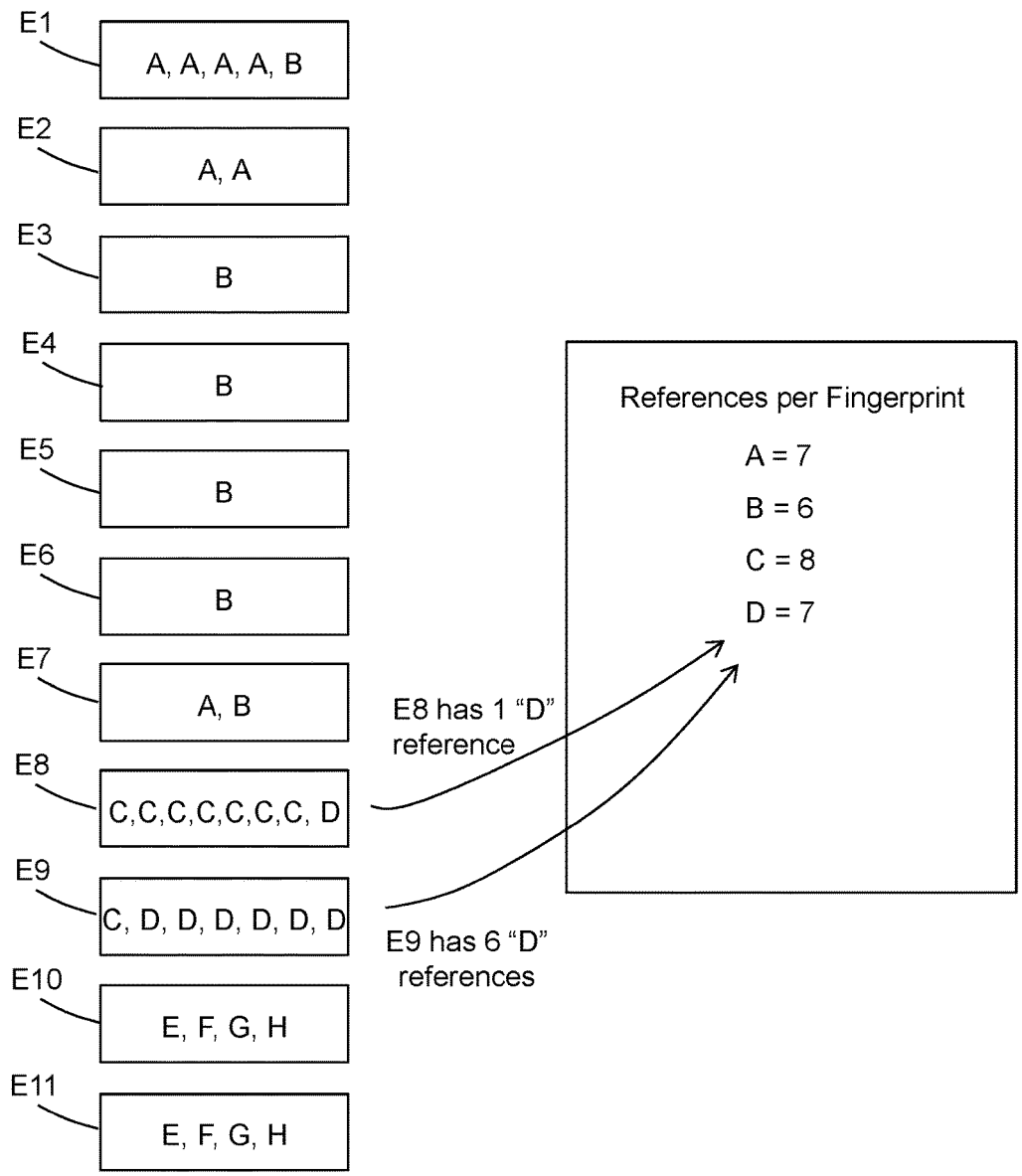
Figure 5F:
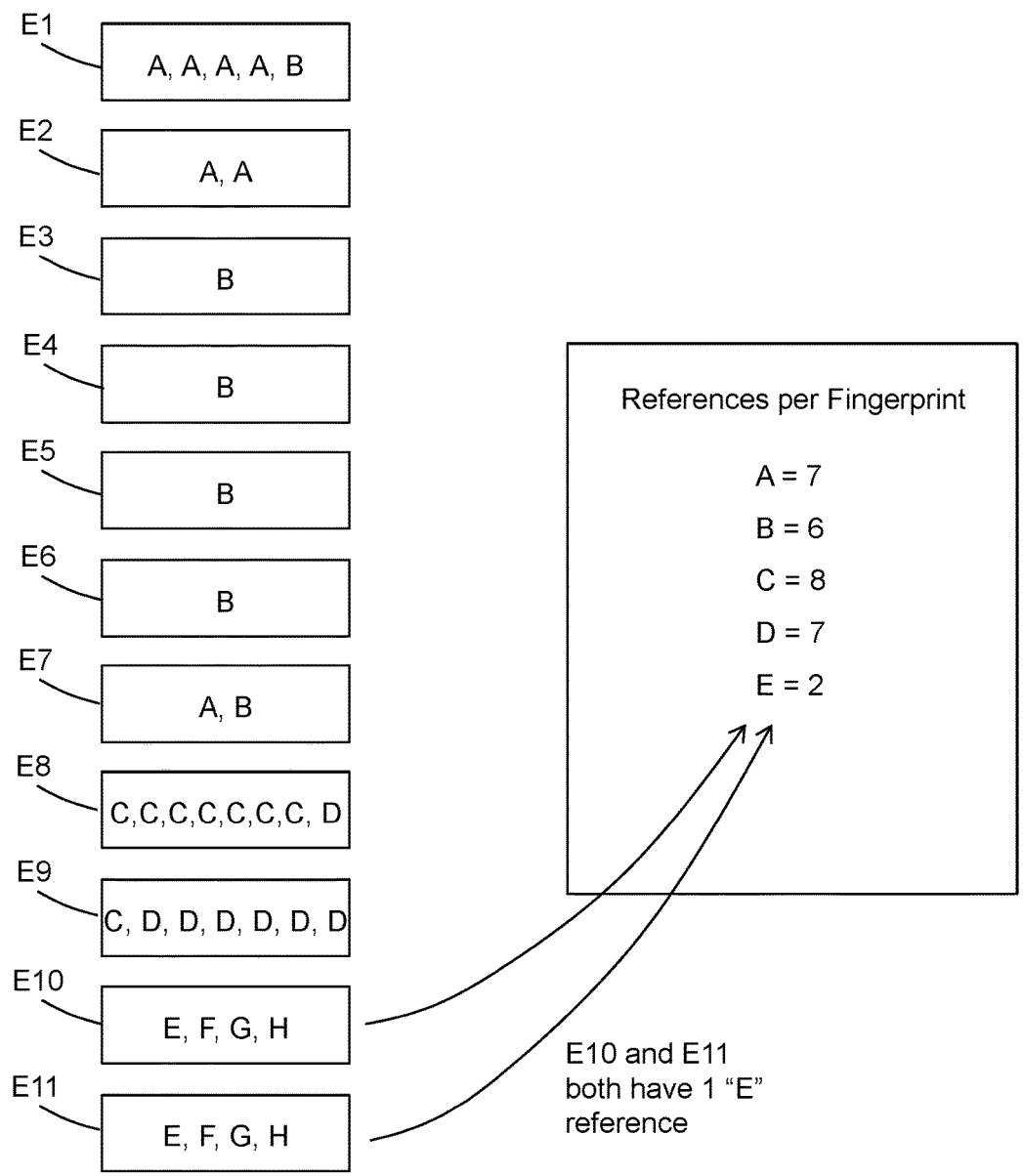
Figure 5G:
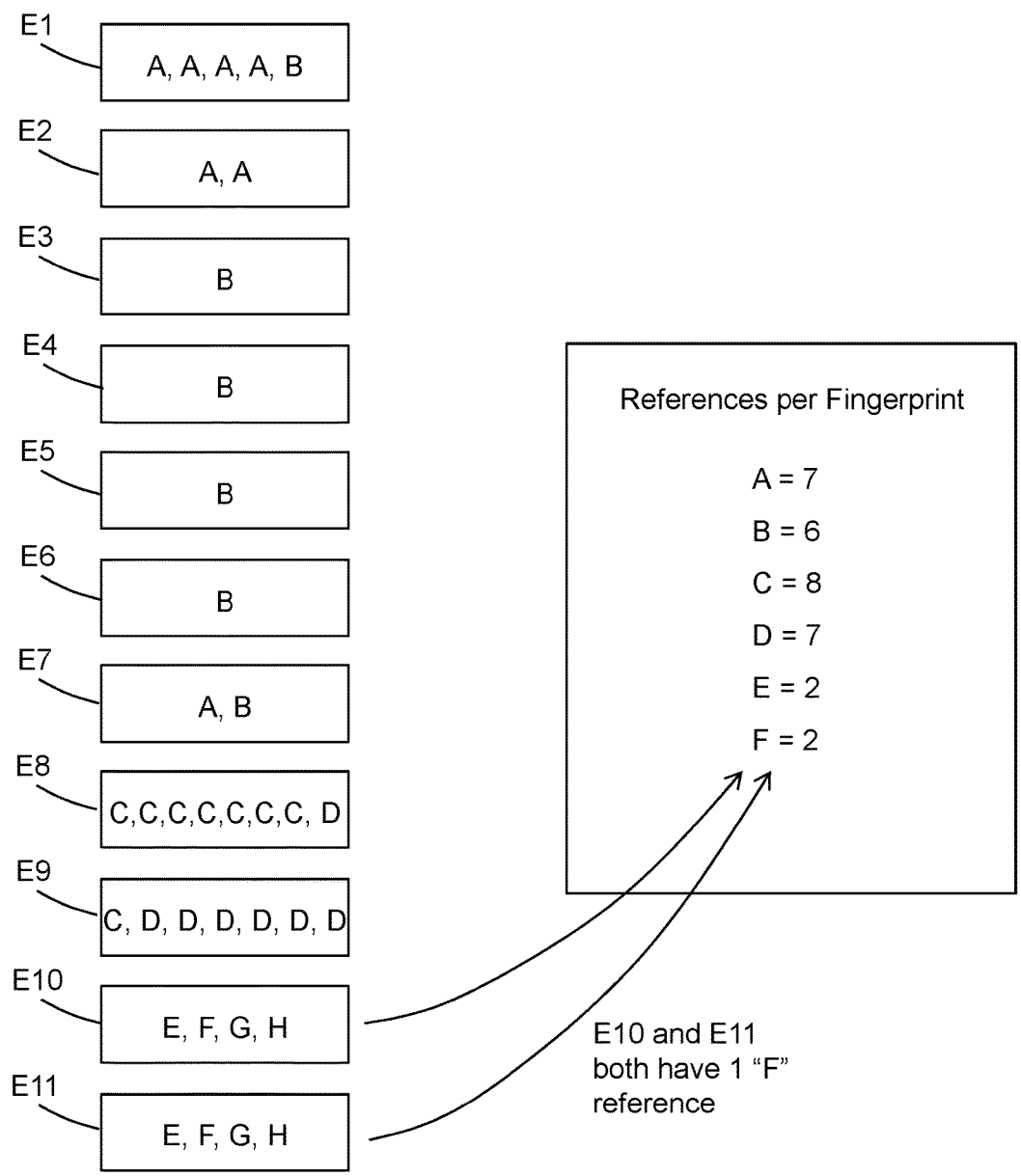
Figure 5H:
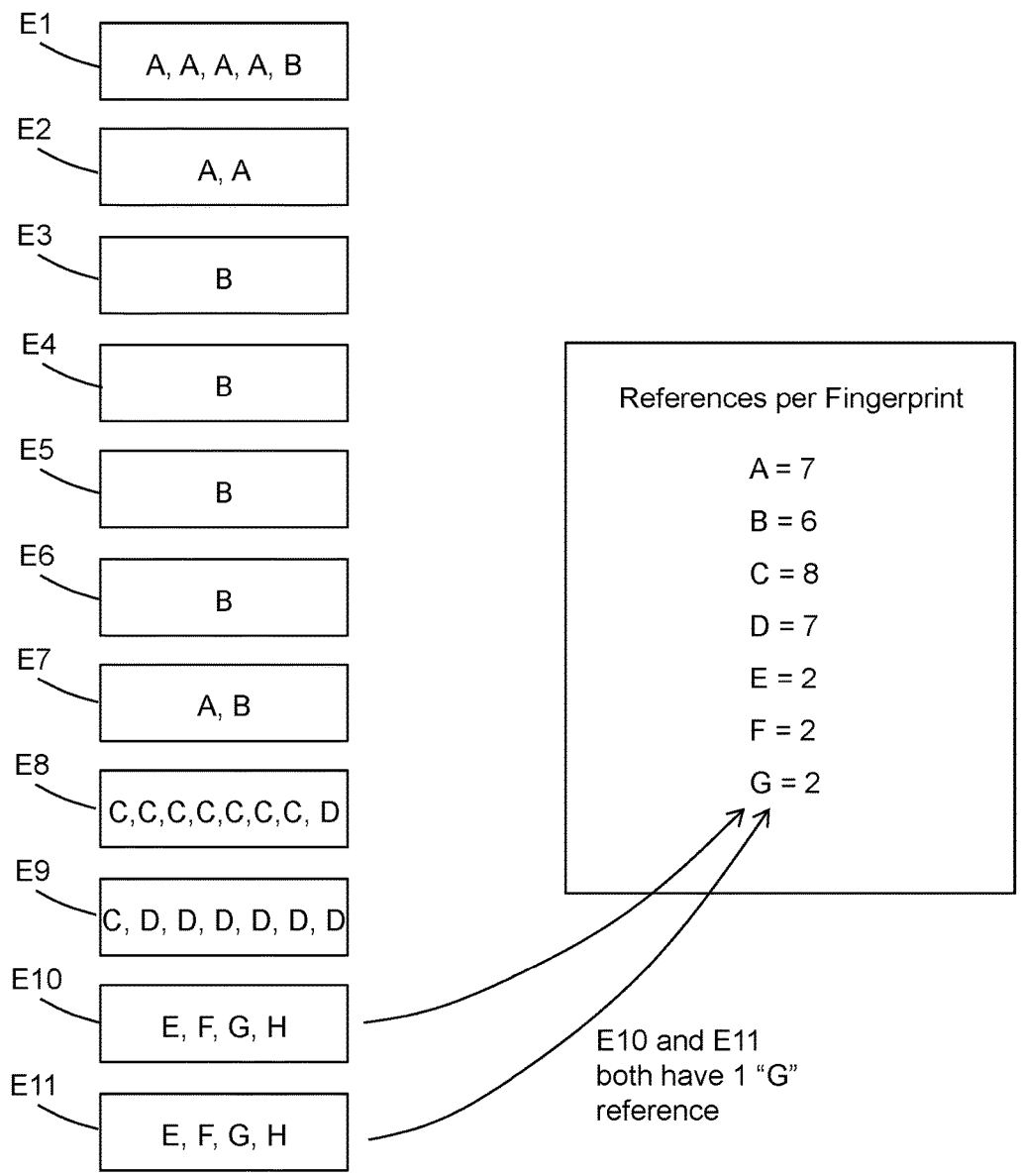
Figure 5I:
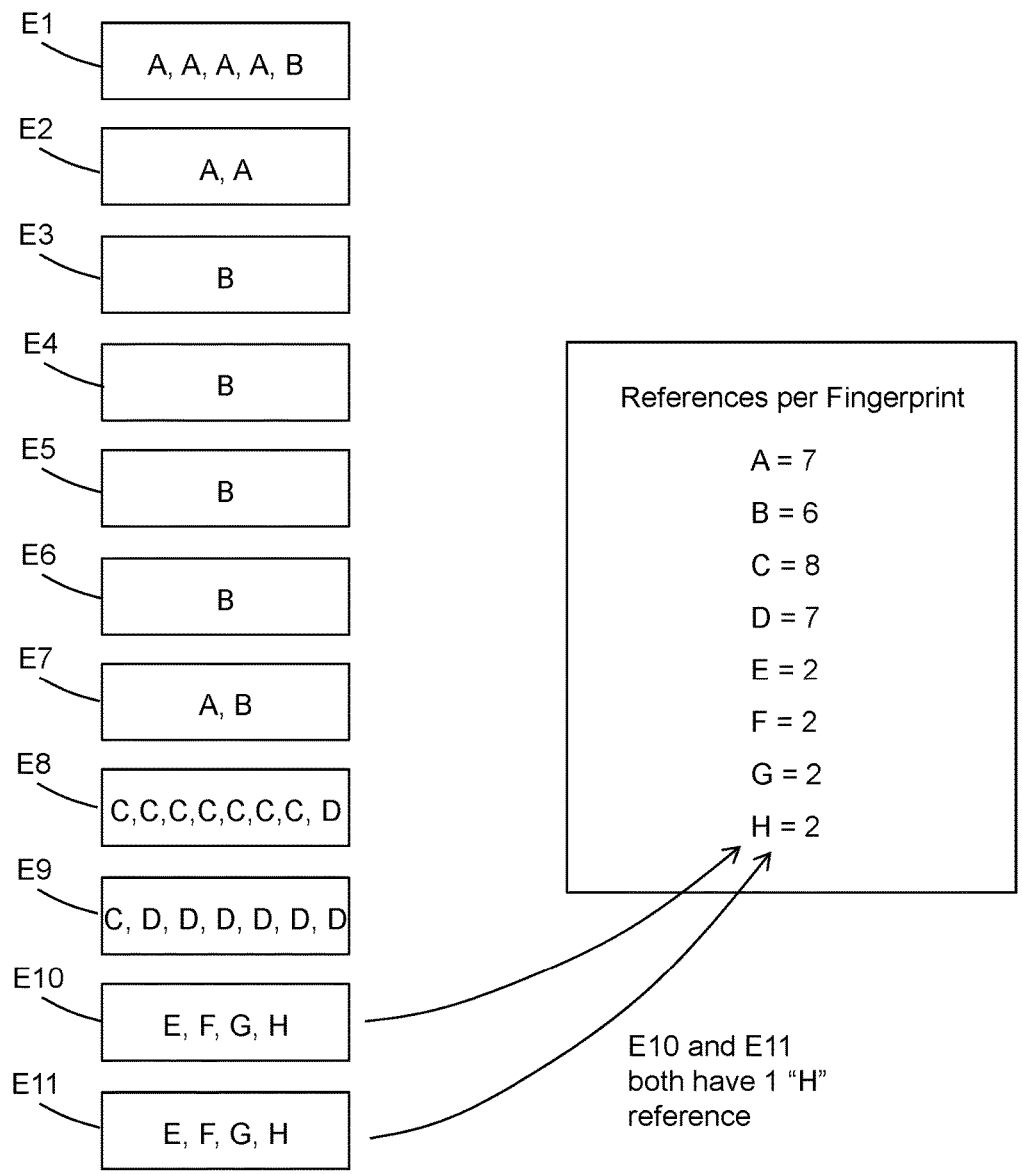

A similar process can establish the reference count for the other fingerprints. FIG. 5C illustrates the process to perform the reference count for fingerprint "B". Here, each of extents E1, E3, E4, E5, E6, and E7 has one "B" reference, totaling 6 references for this fingerprint. FIG. 5D illustrates the process to perform the reference count for fingerprint "C". Extent E8 has seven "C" references and extent E9 has one "C" reference, resulting in a total of 8 references for the "C" fingerprint. FIG. 5E illustrates the process to perform the reference count for fingerprint "D". Extent E9 has six "D" references and extent E8 has one "D" reference, resulting in a total of 7 references for this fingerprint. FIG. 5F illustrates the process to perform the reference count for fingerprint "E". Extents E10 and E11 both have one reference each for the "E" fingerprint, resulting in a total of 2 references for this fingerprint. FIG. 5G illustrates the process to perform the reference count for fingerprint "F". Extents E10 and E11 both have one reference each for the "F" fingerprint, resulting in a total of 2 references for this fingerprint. FIG. 5H illustrates the process to perform the reference count for fingerprint "G". Extents E10 and E11 both have one reference each for the "G" fingerprint, resulting in a total of 2 references for this fingerprint. Finally, FIG. 5I illustrates the process to perform the reference count for fingerprint "H". Extents E10 and E11 both have one reference each for the "H" fingerprint, resulting in a total of 2 references for this fingerprint.

Next, a score is established for each extent. In this case, assume that each of the fingerprints have already been de-duplicated in the past (i.e., the count of de-duplication references for each fingerprint is greater than zero). Therefore, the score of each extent is merely the total of the reference counts for that extent. As shown in FIG. 5J, the score of the E1 extent is the reference count for fingerprint "A" added to the reference count for fingerprint "B", i.e., 7 (count for "A")+6 (count for "B")=13 (total for extent). The scores for each of the extents are shown in FIG. 5J.

Figure 5K:
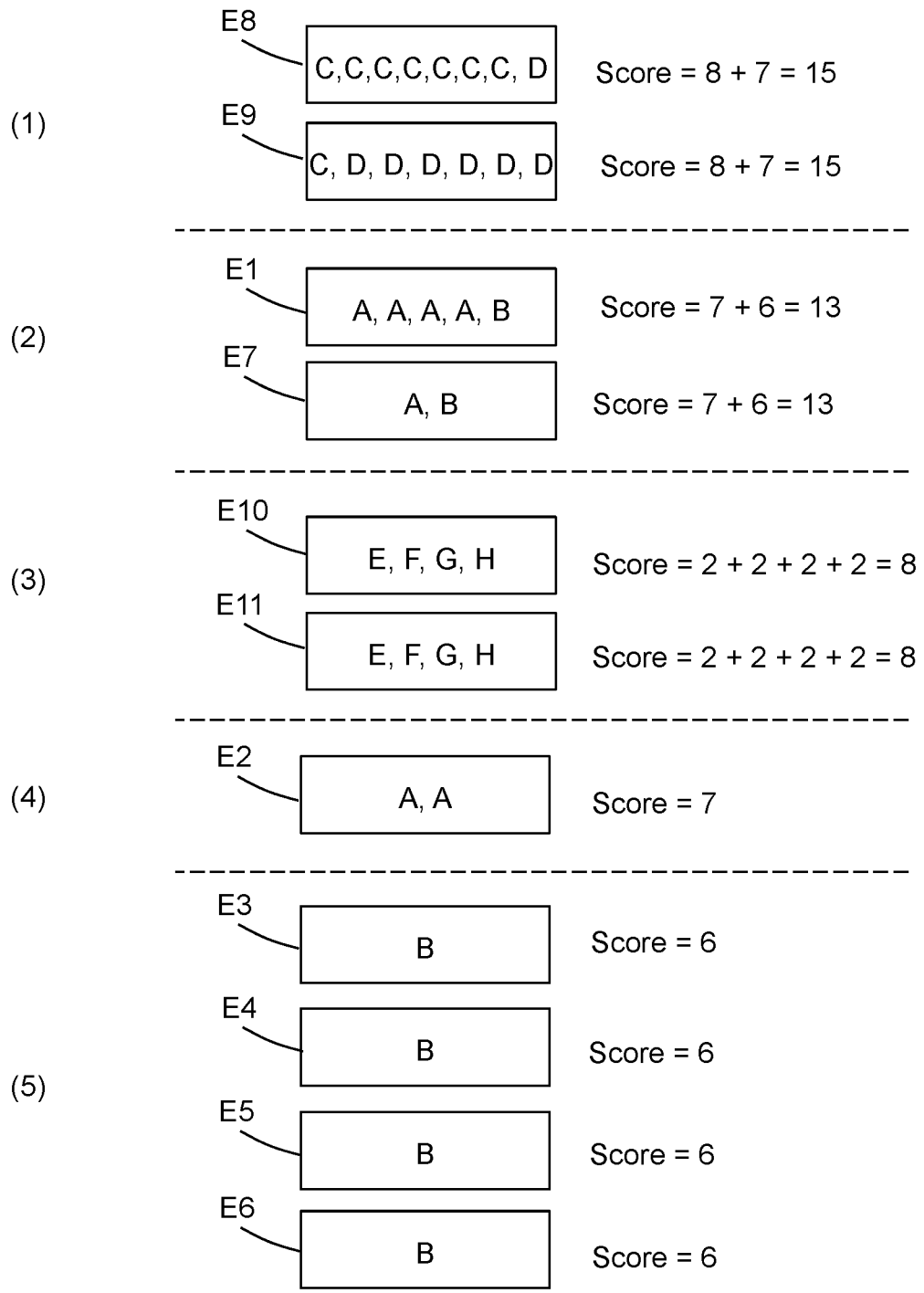

The next action is to sort and order the extents using these scores. As shown in FIG. 5K, this results in an ordering of the extents in the following order: (1) E8, E9; (2) E1, E7; (3) E10, E11; (4) E2; and (5) E3, E4, E5, E6. For de-duplication purposes, the highest yield would result from first processing the group (1) extents, followed by the group (2) extents, followed by the group (3) extents, followed by the group (4) extents, and then finally the group (5) extents. Assuming that there is a limitation on the amount of extents to de-duplicate, then the de-duplication processing would occur in this order.

Some storage systems will organize extents into "extent groups". An extent group may be stored as a single file on disk. The reason for the extent group is that this group can form a unit of recovery, replication, and many other storage functions within the system.

Figure 6:
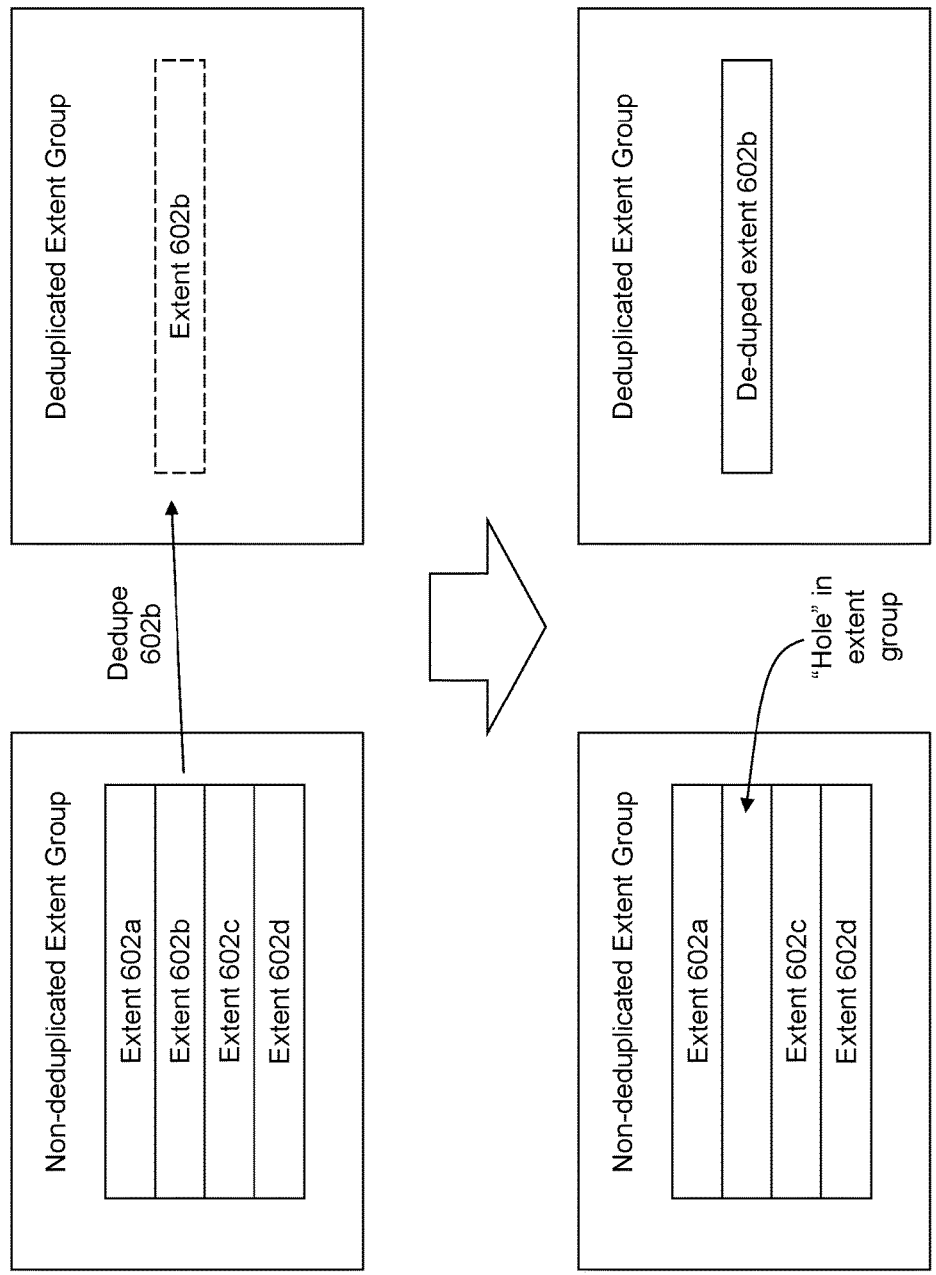
FIG. 6 illustrates de-duplication involving extent groups.

In some embodiments, when an extent is de-duplicated from within an extent group of non-deduplicated extents, that extent may then transferred to another extent group for de-duplicated extents. This is illustrated in the top portion of FIG. 6. The potential problem, as shown in the bottom portion of FIG. 6, is that the original extent group now includes a "hole" at the former location of the extent that has been de-duplicated. This creates a possible fragmentation problem that needs to be addressed, which may be an expensive problem depending upon the extent of the fragmentation caused by the de-duplication.

Figure 7:
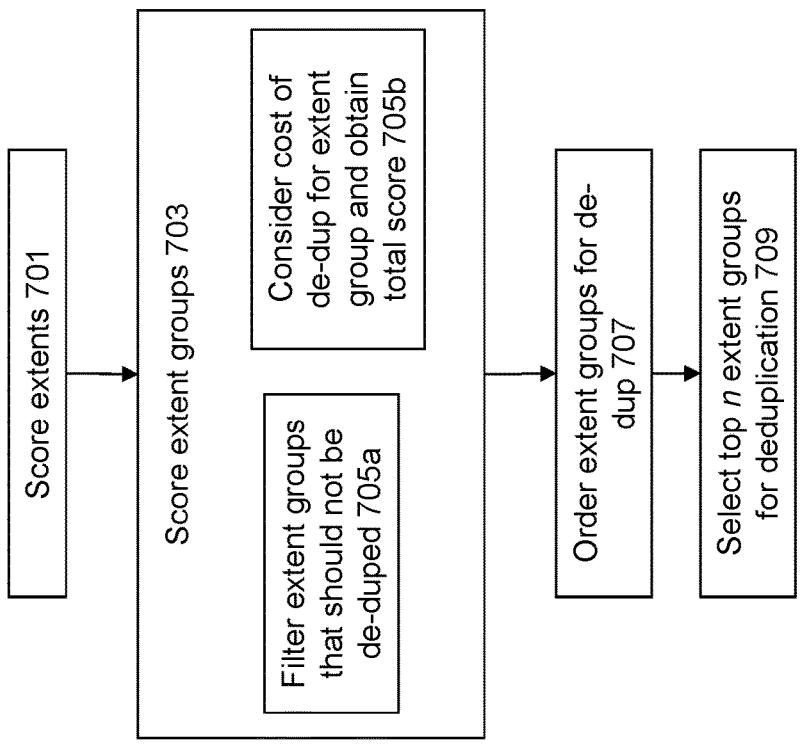
FIG. 7 shows a flowchart of an approach to implement de-duplication for extent groups.

FIG. 7 shows a flowchart of an approach to implement de-duplication that addresses this issue. At 701, individual extents are scored. The approach described above with regards to FIGS. 4 and 5A-K describes an example approach to score extents in the system.

At 703, extent groups are scored using the scores derived for the individual extents within the extent groups. In the approach of 705b, the overall score of the extent group is the total of the scores of the individual extents in the group minus any fragmentation cost assessed for de-duplication of those extents. In the approach of 705a, a determination is made of the impact of disturbing the packing of the extent group, where any impact that exceeds a given threshold will produce an absolute "yes" or "no" determination that will filter that extent group from consideration for de-duplication.

In some embodiments, the selection process will select extents such that the remaining live extents from the extent group can be migrated and the extent group filtered out to avoid disturbing well-packed extent group. Some possible criteria which can be used to filter an extent group include: (a) where dead space in the extent group exceeds 50%; and/or (b) the number of remaining live extents in the extent group is less than or equal to the number of dead and potential to-be-deduplicated extents.

In some cases, the scoring may be affected by removal of certain extents groups from consideration, since this changes the reference count of certain of the fingerprints being processed. Therefore, one approach is to re-calculate the scoring for the extents if any extent groups have been filtered from consideration. Another approach is to merely ignore the possible changes to the scoring.

At 707, the extent groups are ordered using the extent group scoring. Thereafter, at 709, the extents for the top n extent groups are selected for de-duplication.

With the above process, only fingerprinted data is considered for de-duplication. In some implementations, fingerprints are generated only for I/O writes greater than 64 KB. In addition, in some applications such as VDI, only the initial portion (e.g., first 24 GB) of a storage unit (e.g., virtual disk) is considered for deduplication with the assumption that the OS bits tend to lie in this region. The problem is that these limitations restrict the amount of data that can be de-duplicated, and in turn limit the disk space savings provided by the de-duplication.

According to some embodiments, all data in the system is fingerprinted. To control metadata bloat introduced by the additional fingerprints, requests can be issued to clear fingerprints from data that correspond to low reference counts and/or have not been accessed recently.

Figure 8:
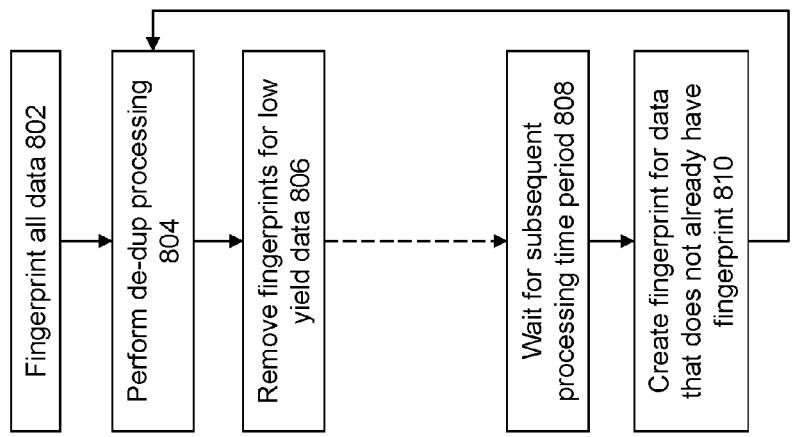
FIG. 8 shows a flowchart of an approach to implement fingerprinting of all data.

FIG. 8 shows a flowchart of an approach to implement this embodiment of the invention. At 802, all data for I/O writes are fingerprinted, regardless of the size of the data written by the I/O operation and regardless of the position of the that data within the overall data unit.

At 804, de-duplication processing is performed in the system, e.g., using the approach described in detail above. This processing identifies the reference counts for all of the fingerprints in the system. As previously noted, the high-yield fingerprints are specifically identified for de-duplication. For purposes of the current processing, it is noted that the reference counts also identify the low-yield fingerprints, particularly the fingerprints that have extremely low reference counts.

At this point, at 806, the fingerprint metadata for the low-yield fingerprints can be removed from the system metadata. This clears the metadata bloat from the system for the fingerprints having marginal utility for de-duplication purposes.

A waiting period then ensues at 808. At some point in the future, at 810, fingerprints can be re-created for data which do not have fingerprints. By re-creating the fingerprints, this checks for any changes to system conditions that may affect the viability of de-duplicating the data items that previously had their fingerprints removed. The processing then loops back to 804 to perform de-duplication processing.

This cycle of fingerprint creation/removal therefore provides the best of both worlds, since fingerprints exist at some point in time for all data in the system, expanding the data that can be considered for de-duplication and maximizing potential space savings. This is achieved while also controlling metadata bloat.

This approach also enhances the ability to implement smaller chunk sizes for de-duplication. As previously noted, in general, smaller de-duplication chunk sizes provide higher disk space savings compared to larger chunk sizes. However, using smaller de-duplication chunks result in higher metadata growth. Therefore, some implementations have to compromise on a larger default chunk size (e.g., 16 KB) to mitigate the impact of metadata growth. With the current embodiment, since metadata bloat is controlled by removing low-yield fingerprints, chunk sizes can be smaller without excessively increasing metadata growth, e.g., to any smaller size such as 8 KB, 4 Kb, or even smaller.

In some embodiments, a map-reduce process is employed to perform the above-described de-duplication processing. Map reduce functions typically involve a "map" step that takes an input set of data, divides the input into smaller portions, and distributes the divided portions among a group of slave or worker nodes for processing. The output of the map tasks feed directly into the "reduce" tasks (this is the shuffle referred to earlier in this document). More specifically, each map task produces output data that is partitioned into sets and each set feeds into a distinct reduce task. Thus, if there are m map tasks and r reduce tasks in a given set of MapReduce job(s), each of the m map tasks produces output for each of the r reduce tasks and each of the r reduce tasks processes input from each of the m map tasks.

In many cases, both the map and reduce steps are performed relative to key-value pairs of data, where the map step takes data from a first domain to a second domain. This can be performed in parallel using multiple distributed management processing nodes (also referred to herein as "curator nodes"). The resultant list of modified key-value pairs are then grouped together for further processing. The reduce step can also be applied in parallel to produce a collection or list of data ((key, list(value))–>list(key, value)).

In some embodiments of the present invention, map reduction processing is employed to perform the full and partial scans on the system metadata. This allows the workload to be partitioned into different portions that can be concurrently operated upon by the different curator nodes in the system, e.g., to generate the fingerprint reference counts and/or to generate extent and extent group scoring.

Therefore, what has been described is an improved approach for implementing de-duplication. The present disclosure provides an approach that intelligently performs de-duplication by selecting data such that the de-duplication efficacy of the storage will be increased without arbitrarily increasing metadata size. As the system becomes more intelligent and selective in choosing high-yield data for de-duplication, this allows relaxation upon possible restrictions on generating fingerprints with respect to I/O size and storage region offsets.

The present embodiments provide an effective increase of de-duplication factor without large metadata multipliers, e.g., by selecting extents using reference count and score per fingerprint. In addition, various embodiments limit fragmentation within extents, e.g., by de-duplicating whole extents. Certain embodiments limit fragmentation within extent groups, e.g., by choosing extent groups such that the remaining live extents can be migrated out and the extent group deleted.

System Architecture Overview and Additional System Architecture Examples

Figure 9A:
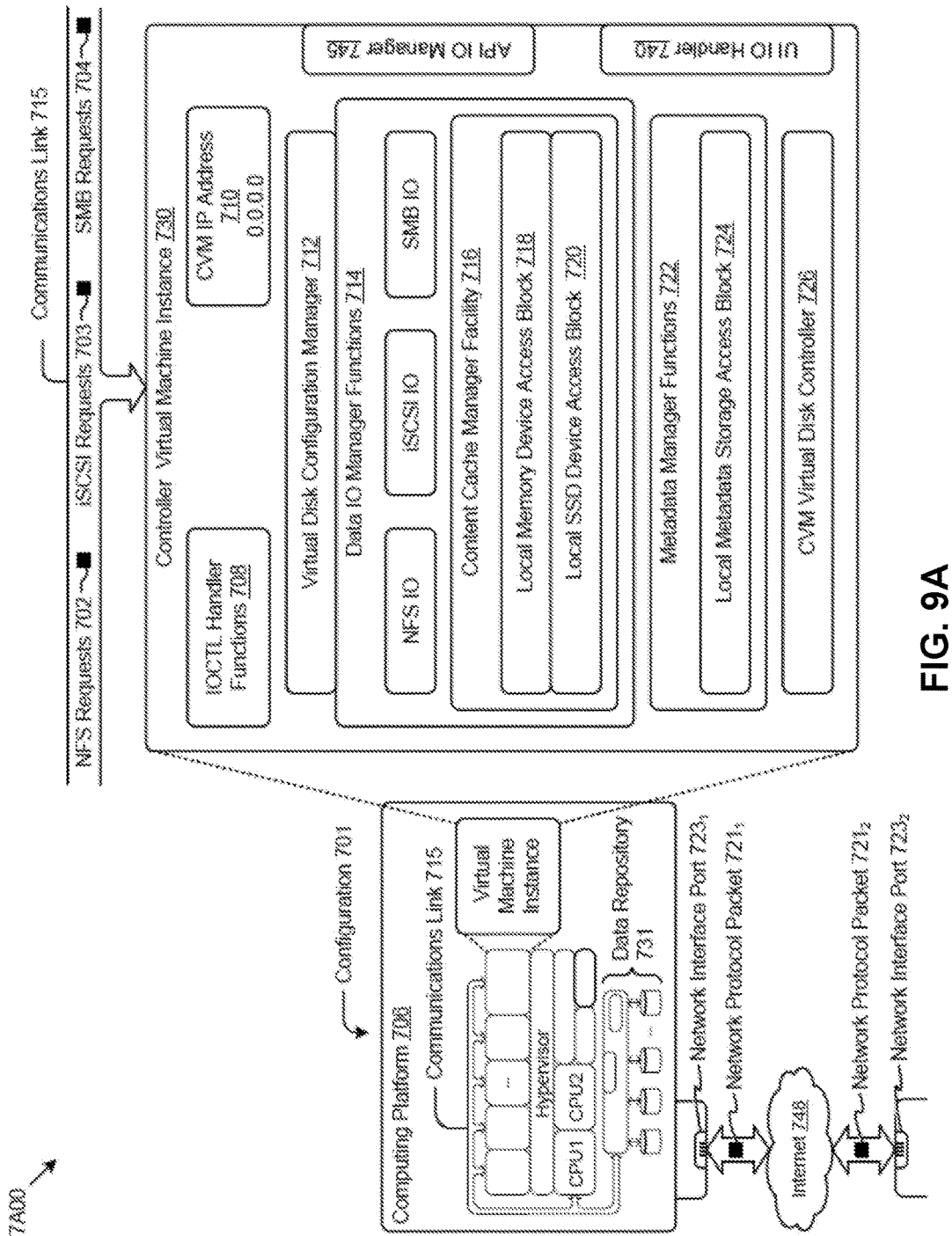
FIGS. 9A-B are block diagrams of example computing systems suitable for implementing an embodiment of the present invention.

FIG. 9A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block IO storage requests as of network file system (NFS) requests in the form of NFS requests 702, and/or internet small computer storage interface (iSCSI) block IO requests in the form of iSCSI requests 703,and/or Samba file system requests (SMB) in the form of SMB requests 704. The controller virtual machine instance publishes and responds to an internet protocol (IP) address (e.g., see CVM IP address 710. Various forms of input and output (IO) can be handled by one or more IO control handler IOCTL handler functions 708 that interface to other functions such as data IO manager functions 714, metadata manager functions 722. As shown, the data IO manager functions can include communication with a virtual disk configuration manager 712, and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local meta-data storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet $721_1$ and $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to setup and ongoing uses of the herein-disclosed hypervisor agnostic channel for secure guest agent communications.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of secure hypervisor agnostic channels). Such files or records can be brought into and/or stored in volatile or non-volatile memory.

Figure 9B:
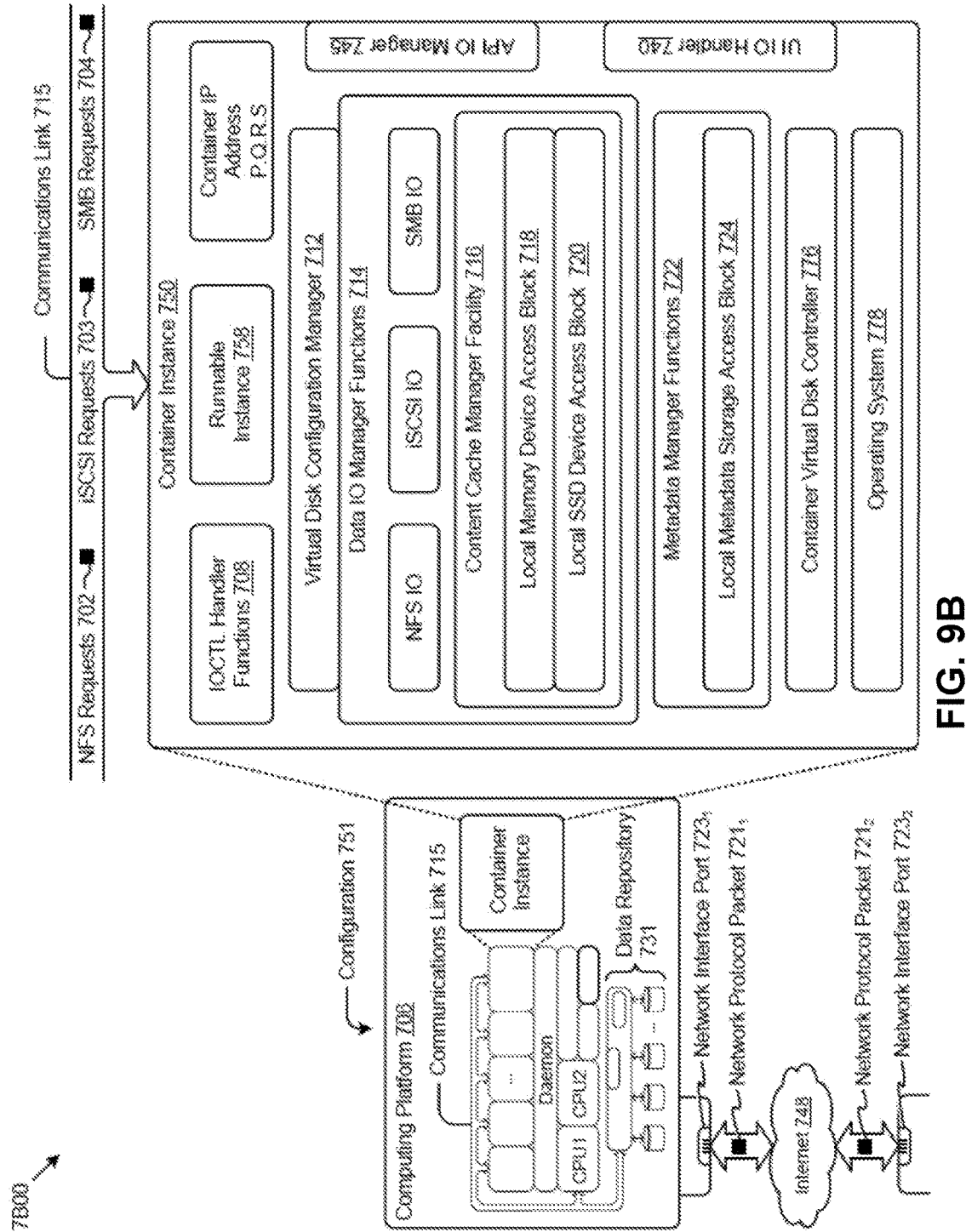

FIG. 9B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 776, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for selectively performing data de-duplication in a storage device, comprising:
   generating, by a storage management system of the storage device, a non-deduplication reference count for a fingerprint;
   generating a de-duplication reference count for the fingerprint;
   computing scores for a plurality of extents from the non-deduplication reference count and the de-duplication reference count;
   ordering the plurality of extents from the scores to generate an ordered list of extents;
   selecting at least some of the plurality of extents from the ordered list of the extents for de-duplication; and
   removing copies of data from the at least some of the plurality of extents selected for de-duplication by replacing the copies of data removed with a reference to one or more remaining copies stored on another extent, wherein removing the copies of data from the at least some of the plurality of extents removes a contiguous portion of data from the storage device.

2. The method of claim 1, wherein the scores for the plurality of extents correlates to greater potential savings for data items having greater number of copies.

3. The method of claim 1, wherein the fingerprint corresponds to a SHA1 fingerprint.

4. The method of claim 1, wherein a threshold is established for an amount of data for de-duplication in a given processing cycle.

5. The method of claim 1, wherein a time period is established to periodically perform de-duplication processing.

6. The method of claim 1, wherein the scores are amalgamated on an extent group basis, and the method further comprises:
   calculating extent group scores for a plurality of extents;
   ordering the plurality of extent groups using the extent group scores; and
   selecting at least some of the plurality of extents for de-duplication.

7. The method of claim 6, wherein the extent group scores are calculated as a total of scores of individual extents in an extent group minus fragmentation costs assessed for de-duplication of the individual extents.

8. The method of claim 6, wherein an extent group is filtered to exclude the extent group if (a) a dead space in the extent group exceeds 50% upon de-duplication or (b) if a number of remaining live extents in the extent group after the de-duplication is less than or equal to a number of dead and potential to-be-deduplicated extents.

9. The method of claim 1, wherein all data is fingerprinted and the fingerprints for extents having low yields for de-duplication are subsequently removed.

10. The method of claim 1, wherein map-reduce processing is performed to process de-duplication on multiple distributed processing nodes.

11. A computer program product embodied on a non-transitory computer readable medium, the non-transitory computer readable medium having stored thereon a sequence of instructions which, when executed by a processor causes the processor to execute a method for selectively performing data de-duplication in a storage device, the method comprising:
   generating, by a storage management system of the storage device, a non-deduplication reference count for a fingerprint;
   generating a de-duplication reference count for the fingerprint;
   computing scores for a plurality of extents from the non-deduplication reference count and the de-duplication reference count;
   ordering the plurality of extents from the scores to generate an ordered list of extents;
   selecting at least some of the plurality of extents from the ordered list of the extents for de-duplication; and
   removing copies of data from the at least some of the plurality of extents selected for de-duplication by replacing the copies of data removed with a reference to one or more remaining copies stored on another extent, wherein removing the copies of data from the at least some of the plurality of extents removes a contiguous portion of data from the storage device.

12. The computer program product of claim 11, wherein the scores for the plurality of extents correlates to greater potential savings for data items having greater number of copies.

13. The computer program product of claim 11, wherein the fingerprint corresponds to a SHA1 fingerprint.

14. The computer program product of claim 11, wherein a threshold is established for an amount of data for de-duplication in a given processing cycle.

15. The computer program product of claim 11, wherein a time period is established to periodically perform de-duplication processing.

16. The computer program product of claim 11, wherein the scores are amalgamated on an extent group basis, and the sequence of instructions further comprises:
calculating extent group scores for a plurality of extents;
ordering the plurality of extent groups using the extent group scores; and
selecting at least some of the plurality of extents for de-duplication.

17. The computer program product of claim 16, wherein the extent group scores are calculated as a total of scores of individual extents in an extent group minus fragmentation costs assessed for de-duplication of the individual extents.

18. The computer program product of claim 16, wherein an extent group is filtered to exclude the extent group if (a) a dead space in the extent group exceeds 50% upon de-duplication or (b) if a number of remaining live extents in the extent group after the de-duplication is less than or equal to a number of dead and potential to-be-deduplicated extents.

19. The computer program product of claim 11, wherein all data is fingerprinted and the fingerprints for extents having low yields for de-duplication are subsequently removed.

20. The computer program product of claim 11, wherein map-reduce processing is performed to process de-duplication on multiple distributed processing nodes.

21. A system for selectively performing data de-duplication in a storage device, comprising:
a processor to handle computing instructions to access the storage devices; and
a computer readable medium comprising executable code that is executable by the processor for generating, by a storage management system of the storage device, a non-deduplication reference count for a fingerprint, generating a de-duplication reference count for the fingerprint, computing scores for a plurality of extents from the non-deduplication reference count and the de-duplication reference count; ordering the plurality of extents from the scores to generate an ordered list of extents; selecting at least some of the plurality of extents from the ordered list of the extents for de-duplication; and
removing copies of data from the at least some of the plurality of extents selected for de-duplication by replacing the copies of data removed with a reference to one or more remaining copies stored on another extent, wherein removing the copies of data from the at least some of the plurality of extents removes a contiguous portion of data from the storage device.

22. The system of claim 21, wherein the scores for the plurality of extents correlates to greater potential savings for data items having greater number of copies.

23. The system of claim 21, wherein the fingerprint corresponds to a SHA1 fingerprint.

24. The system of claim 21, wherein a threshold is established for an amount of data for de-duplication in a given processing cycle.

25. The system of claim 21, wherein a time period is established to periodically perform de-duplication processing.

26. The system of claim 21, wherein the scores are amalgamated on an extent group basis, and the executable code further performs calculating extent group scores for a plurality of extents, ordering the plurality of extent groups using the extent group scores, and selecting at least some of the plurality of extents for de-duplication.

27. The system of claim 26, wherein the extent group scores are calculated as a total of scores of individual extents in an extent group minus fragmentation costs assessed for de-duplication of the individual extents.

28. The system of claim 26, wherein an extent group is filtered to exclude the extent group if (a) a dead space in the extent group exceeds 50% upon de-duplication or (b) if a number of remaining live extents in the extent group after the de-duplication is less than or equal to a number of dead and potential to-be-deduplicated extents.

29. The system of claim 21, wherein all data is fingerprinted and the fingerprints for extents having low yields for de-duplication are subsequently removed.

30. The system of claim 21, wherein map-reduce processing is performed to process de-duplication on multiple distributed processing nodes.

* * * * *